(12) United States Patent
Mason, Jr. et al.

(10) Patent No.: US 8,525,692 B2
(45) Date of Patent: Sep. 3, 2013

(54) TECHNIQUES FOR LIMITING DEMAND FROM AN ELECTRICITY METER WITH AN INSTALLED RELAY

(75) Inventors: Robert T. Mason, Jr., Raleigh, NC (US); Keith D. Richeson, Cary, NC (US); Charlie E. Minton, III, Willow Spring, NC (US)

(73) Assignee: Elster Solutions, LLC, Raleigh, NC (US)

( * ) Notice: Subject to any disclaimer, the term of this patent is extended or adjusted under 35 U.S.C. 154(b) by 780 days.

(21) Appl. No.: 12/482,681

(22) Filed: Jun. 11, 2009

(65) Prior Publication Data

US 2009/0309756 A1    Dec. 17, 2009

Related U.S. Application Data

(60) Provisional application No. 61/061,286, filed on Jun. 13, 2008.

(51) Int. Cl.
*G08C 19/16* (2006.01)
*G08B 23/00* (2006.01)
*G05D 3/12* (2006.01)
*G05D 5/00* (2006.01)
*G05D 9/00* (2006.01)
*G05D 11/00* (2006.01)
*G05D 17/00* (2006.01)
*G01R 21/00* (2006.01)
*G01R 21/06* (2006.01)

(52) U.S. Cl.
USPC ............. 340/870.02; 340/870.01; 700/291; 700/295; 702/61; 702/62

(58) Field of Classification Search
USPC ............... 340/870.01–870.18; 700/22, 90, 700/275, 276, 286, 291, 295; 702/57–62
See application file for complete search history.

(56) References Cited

U.S. PATENT DOCUMENTS 3,445,815 A    5/1969    Saltzberg et al.
3,858,212 A    12/1974    Tompkins et al.
(Continued)

FOREIGN PATENT DOCUMENTS

CH    682196 A5    7/1993
EP    0 395 495 A1    10/1990
(Continued)

OTHER PUBLICATIONS

Internet Printout, http://www.ardis.com, "Ardis Two-Way, Wireless Data Communications," ARDIS, Sep. 23, 1998.
(Continued)

*Primary Examiner* — Hai Phan
*Assistant Examiner* — Franklin Balseca
(74) *Attorney, Agent, or Firm* — Woodcock Washburn LLP

(57) ABSTRACT

An electricity meter capable of performing a method for limiting an electricity load in communication with the electricity meter is disclosed. The electricity meter includes at least one load control and the electricity meter has one or more predetermined time-of-use tiers. Each of the one or more predetermined time-of-use tiers has a corresponding time-of-use demand threshold. The method comprises determining a present time-of-use tier; determining a present time-of-use demand for the electricity load in the present time-of-use tier; comparing the present time-of-use demand to the time-of-use demand threshold corresponding to the present time-of-use tier; and setting the at least one load control to a de-energize mode when a de-energize condition is satisfied. The de-energize condition may include sub-conditions such as the present time-of-use demand exceeding the time-of-use demand threshold corresponding to the present time-of-use tier.

16 Claims, 8 Drawing Sheets

(56) References Cited

U.S. PATENT DOCUMENTS

| | | | |
|---|---|---|---|
| 3,878,512 | A | 4/1975 | Kobayashi et al. |
| 3,973,240 | A | 8/1976 | Fong |
| 4,031,513 | A | 6/1977 | Simciak |
| 4,056,107 | A | 11/1977 | Todd et al. |
| 4,066,964 | A | 1/1978 | Costanza et al. |
| 4,132,981 | A | 1/1979 | White |
| 4,190,800 | A | 2/1980 | Kelly, Jr. et al. |
| 4,204,195 | A | 5/1980 | Bogacki |
| 4,211,933 | A * | 7/1980 | Hedges et al. .................. 307/35 |
| 4,218,737 | A | 8/1980 | Buscher et al. |
| 4,250,489 | A | 2/1981 | Dudash et al. |
| 4,254,472 | A | 3/1981 | Juengel et al. |
| 4,315,248 | A * | 2/1982 | Ward .......................... 340/12.11 |
| 4,319,358 | A | 3/1982 | Sepp |
| 4,321,582 | A | 3/1982 | Banghart |
| 4,322,842 | A | 3/1982 | Martinez |
| 4,328,581 | A | 5/1982 | Harmon et al. |
| 4,361,851 | A | 11/1982 | Asip et al. |
| 4,361,890 | A | 11/1982 | Green, Jr. et al. |
| 4,396,915 | A | 8/1983 | Farnsworth et al. |
| 4,405,829 | A | 9/1983 | Rivest et al. |
| 4,415,896 | A | 11/1983 | Allgood |
| 4,466,001 | A | 8/1984 | Moore et al. |
| 4,504,831 | A | 3/1985 | Jahr et al. |
| 4,506,386 | A | 3/1985 | Ichikawa et al. |
| 4,513,415 | A | 4/1985 | Martinez |
| 4,525,861 | A | 6/1985 | Freeburg |
| 4,600,923 | A | 7/1986 | Hicks et al. |
| 4,608,699 | A | 8/1986 | Batlivala et al. |
| 4,611,333 | A | 9/1986 | McCallister et al. |
| 4,614,945 | A | 9/1986 | Brunius et al. |
| 4,617,566 | A | 10/1986 | Diamond |
| 4,628,313 | A | 12/1986 | Gombrich et al. |
| 4,631,538 | A | 12/1986 | Carreno |
| 4,638,298 | A | 1/1987 | Spiro |
| 4,644,321 | A | 2/1987 | Kennon |
| 4,653,076 | A | 3/1987 | Jerrim et al. |
| 4,672,555 | A | 6/1987 | Hart et al. |
| 4,680,704 | A | 7/1987 | Konicek et al. |
| 4,688,038 | A | 8/1987 | Giammarese |
| 4,692,761 | A | 9/1987 | Robinton |
| 4,707,852 | A | 11/1987 | Jahr et al. |
| 4,713,837 | A | 12/1987 | Gordon |
| 4,724,435 | A | 2/1988 | Moses et al. |
| 4,728,950 | A | 3/1988 | Hendrickson et al. |
| 4,734,680 | A | 3/1988 | Gehman et al. |
| 4,749,992 | A | 6/1988 | Fitzemeyer et al. |
| 4,757,456 | A | 7/1988 | Benghiat |
| 4,769,772 | A | 9/1988 | Dwyer |
| 4,783,748 | A | 11/1988 | Swartzrauber et al. |
| 4,792,946 | A | 12/1988 | Mayo |
| 4,799,059 | A | 1/1989 | Grindahl et al. |
| 4,804,938 | A | 2/1989 | Rouse et al. |
| 4,804,957 | A | 2/1989 | Selph et al. |
| 4,811,011 | A | 3/1989 | Sollinger |
| 4,827,514 | A | 5/1989 | Ziolko et al. |
| 4,833,618 | A | 5/1989 | Verma et al. |
| 4,839,645 | A | 6/1989 | Lill |
| 4,841,545 | A | 6/1989 | Endo et al. |
| 4,860,379 | A | 8/1989 | Schoeneberger et al. |
| 4,862,493 | A | 8/1989 | Venkataraman et al. |
| 4,868,877 | A | 9/1989 | Fischer |
| 4,884,021 | A | 11/1989 | Hammond et al. |
| 4,912,722 | A | 3/1990 | Carlin |
| 4,922,518 | A | 5/1990 | Gordon et al. |
| 4,939,726 | A | 7/1990 | Flammer et al. |
| 4,940,974 | A | 7/1990 | Sojka |
| 4,940,976 | A | 7/1990 | Gastouniotis et al. |
| 4,958,359 | A | 9/1990 | Kato |
| 4,964,138 | A | 10/1990 | Nease et al. |
| 4,965,533 | A | 10/1990 | Gilmore |
| 4,972,507 | A | 11/1990 | Lusignan |
| 4,977,515 | A | 12/1990 | Rudden et al. |
| 5,007,052 | A | 4/1991 | Flammer |
| 5,018,165 | A | 5/1991 | Sohner et al. |
| 5,022,046 | A | 6/1991 | Morrow, Jr. |
| 5,032,833 | A | 7/1991 | Laporte |
| 5,053,766 | A | 10/1991 | Ruiz-del-Portal et al. |
| 5,053,774 | A | 10/1991 | Schuermann et al. |
| 5,056,107 | A | 10/1991 | Johnson et al. |
| 5,067,136 | A | 11/1991 | Arthur et al. |
| 5,079,715 | A | 1/1992 | Venkataraman et al. |
| 5,079,768 | A | 1/1992 | Flammer |
| 5,086,292 | A | 2/1992 | Johnson et al. |
| 5,086,385 | A | 2/1992 | Launey |
| 5,090,024 | A | 2/1992 | Vander Mey et al. |
| 5,111,479 | A | 5/1992 | Akazawa |
| 5,115,433 | A | 5/1992 | Baran et al. |
| 5,115,448 | A | 5/1992 | Mori |
| 5,129,096 | A | 7/1992 | Burns |
| 5,130,987 | A | 7/1992 | Flammer |
| 5,132,985 | A | 7/1992 | Hashimoto et al. |
| 5,136,614 | A | 8/1992 | Hiramatsu et al. |
| 5,142,694 | A | 8/1992 | Jackson et al. |
| 5,151,866 | A | 9/1992 | Glaser et al. |
| 5,155,481 | A | 10/1992 | Brennan, Jr. et al. |
| 5,160,926 | A | 11/1992 | Schweitzer, III |
| 5,166,664 | A | 11/1992 | Fish |
| 5,177,767 | A | 1/1993 | Kato |
| 5,179,376 | A | 1/1993 | Pomatto |
| 5,189,694 | A | 2/1993 | Garland |
| 5,194,860 | A | 3/1993 | Jones et al. |
| 5,197,095 | A | 3/1993 | Bonnet |
| 5,204,877 | A | 4/1993 | Endo et al. |
| 5,214,587 | A | 5/1993 | Green |
| 5,225,994 | A | 7/1993 | Arinobu et al. |
| 5,228,029 | A | 7/1993 | Kotzin |
| 5,229,996 | A | 7/1993 | Bäckström et al. |
| 5,239,575 | A | 8/1993 | White et al. |
| 5,239,584 | A | 8/1993 | Hershey et al. |
| 5,243,338 | A | 9/1993 | Brennan, Jr. et al. |
| 5,252,967 | A | 10/1993 | Brennan et al. |
| 5,260,943 | A | 11/1993 | Comroe et al. |
| 5,270,704 | A | 12/1993 | Sosa Quintana et al. |
| 5,280,498 | A | 1/1994 | Tymes et al. |
| 5,280,499 | A | 1/1994 | Suzuki |
| 5,285,469 | A | 2/1994 | Vanderpool |
| 5,287,287 | A | 2/1994 | Chamberlain et al. |
| 5,289,497 | A | 2/1994 | Jacobson et al. |
| 5,295,154 | A | 3/1994 | Meier et al. |
| 5,307,349 | A | 4/1994 | Shloss et al. |
| 5,311,541 | A | 5/1994 | Sanderford, Jr. |
| 5,311,542 | A | 5/1994 | Eder |
| 5,315,531 | A | 5/1994 | Oravetz et al. |
| 5,319,679 | A | 6/1994 | Bagby |
| 5,329,547 | A | 7/1994 | Ling |
| 5,345,225 | A | 9/1994 | Davis |
| 5,359,625 | A | 10/1994 | Vander Mey et al. |
| 5,377,222 | A | 12/1994 | Sanderford, Jr. |
| 5,381,462 | A | 1/1995 | Larson et al. |
| 5,383,134 | A | 1/1995 | Wrzesinski |
| 5,384,712 | A | 1/1995 | Oravetz et al. |
| 5,387,873 | A | 2/1995 | Muller et al. |
| 5,390,360 | A | 2/1995 | Scop et al. |
| 5,406,495 | A | 4/1995 | Hill |
| 5,416,917 | A | 5/1995 | Adair et al. |
| 5,420,799 | A | 5/1995 | Peterson et al. |
| 5,428,636 | A | 6/1995 | Meier |
| 5,430,759 | A | 7/1995 | Yokev et al. |
| 5,432,507 | A | 7/1995 | Mussino et al. |
| 5,432,815 | A | 7/1995 | Kang et al. |
| 5,438,329 | A | 8/1995 | Gastouniotis et al. |
| 5,448,230 | A | 9/1995 | Schanker et al. |
| 5,448,570 | A | 9/1995 | Toda et al. |
| 5,450,088 | A | 9/1995 | Meier et al. |
| 5,452,465 | A | 9/1995 | Geller et al. |
| 5,455,533 | A | 10/1995 | Köllner |
| 5,455,544 | A | 10/1995 | Kechkaylo |
| 5,455,569 | A | 10/1995 | Sherman et al. |
| 5,455,822 | A | 10/1995 | Dixon et al. |
| 5,457,713 | A | 10/1995 | Sanderford, Jr. et al. |
| 5,461,558 | A | 10/1995 | Patsiokas et al. |
| 5,463,657 | A | 10/1995 | Rice |
| 5,473,322 | A | 12/1995 | Carney |

| | | | | | | |
|---|---|---|---|---|---|---|
| 5,475,742 A | 12/1995 | Gilbert | | 5,850,187 A | 12/1998 | Carrender et al. |
| 5,475,867 A | 12/1995 | Blum | | 5,862,391 A | 1/1999 | Salas et al. |
| 5,479,442 A | 12/1995 | Yamamoto | | 5,872,774 A | 2/1999 | Wheatley, III et al. |
| 5,481,259 A | 1/1996 | Bane | | 5,874,903 A | 2/1999 | Shuey et al. |
| 5,488,608 A | 1/1996 | Flammer, III | | 5,875,183 A | 2/1999 | Nitadori |
| 5,491,473 A | 2/1996 | Gilbert | | 5,875,402 A | 2/1999 | Yamawaki |
| 5,493,287 A | 2/1996 | Bane | | 5,884,184 A | 3/1999 | Sheffer |
| 5,495,239 A | 2/1996 | Ouellette | | 5,892,758 A | 4/1999 | Argyroudis |
| 5,497,424 A | 3/1996 | Vanderpool | | 5,896,382 A | 4/1999 | Davis et al. |
| 5,499,243 A | 3/1996 | Hall | | 5,897,607 A | 4/1999 | Jenney et al. |
| 5,500,871 A | 3/1996 | Kato et al. | | 5,898,387 A | 4/1999 | Davis et al. |
| 5,511,188 A | 4/1996 | Pascucci et al. | | 5,907,491 A | 5/1999 | Canada et al. |
| 5,519,388 A | 5/1996 | Adair, Jr. | | 5,907,540 A | 5/1999 | Hayashi |
| 5,521,910 A | 5/1996 | Matthews | | 5,910,799 A | 6/1999 | Carpenter et al. |
| 5,522,044 A | 5/1996 | Pascucci et al. | | 5,923,269 A | 7/1999 | Shuey et al. |
| 5,524,280 A | 6/1996 | Douthitt et al. | | 5,926,103 A | 7/1999 | Petite |
| 5,525,898 A | 6/1996 | Lee, Jr. et al. | | 5,926,531 A | 7/1999 | Petite |
| 5,526,389 A | 6/1996 | Buell et al. | | 5,943,375 A | 8/1999 | Veintimilla |
| 5,528,507 A | 6/1996 | McNamara et al. | | 5,944,842 A | 8/1999 | Propp et al. |
| 5,528,597 A | 6/1996 | Gerszberg et al. | | 5,953,319 A | 9/1999 | Dutta et al. |
| 5,539,775 A | 7/1996 | Tuttle et al. | | 5,958,018 A | 9/1999 | Eng et al. |
| 5,541,589 A | 7/1996 | Delaney | | 5,959,550 A | 9/1999 | Giles |
| 5,544,036 A | 8/1996 | Brown, Jr. et al. | | 5,960,074 A | 9/1999 | Clark |
| 5,546,424 A | 8/1996 | Miyake | | 5,963,146 A | 10/1999 | Johnson et al. |
| 5,548,527 A | 8/1996 | Hemminger et al. | | 5,974,236 A | 10/1999 | Sherman |
| 5,548,633 A | 8/1996 | Kujawa et al. | | 5,986,574 A | 11/1999 | Colton |
| 5,553,094 A | 9/1996 | Johnson et al. | | 6,000,034 A | 12/1999 | Lightbody et al. |
| 5,555,508 A | 9/1996 | Munday et al. | | 6,028,522 A | 2/2000 | Petite |
| 5,559,870 A | 9/1996 | Patton et al. | | 6,034,988 A | 3/2000 | VanderMey et al. |
| 5,566,332 A | 10/1996 | Adair et al. | | 6,035,201 A | 3/2000 | Whitehead |
| 5,570,084 A | 10/1996 | Ritter et al. | | 6,041,056 A | 3/2000 | Bigham et al. |
| 5,572,438 A | 11/1996 | Ehlers et al. | | 6,061,604 A | 5/2000 | Russ et al. |
| 5,574,657 A | 11/1996 | Tofte et al. | | 6,067,029 A | 5/2000 | Durston |
| 5,590,179 A | 12/1996 | Shincovich et al. | | 6,073,169 A | 6/2000 | Shuey et al. |
| 5,592,470 A | 1/1997 | Rudrapatna et al. | | 6,073,174 A | 6/2000 | Montgomerie et al. |
| 5,594,740 A | 1/1997 | LaDue | | 6,078,251 A | 6/2000 | Landt et al. |
| 5,602,744 A | 2/1997 | Meek et al. | | 6,078,909 A | 6/2000 | Knutson |
| 5,617,084 A | 4/1997 | Sears | | 6,088,659 A | 7/2000 | Kelley et al. |
| 5,619,192 A | 4/1997 | Ayala | | 6,091,758 A | 7/2000 | Ciccone et al. |
| 5,619,685 A | 4/1997 | Schiavone | | 6,100,817 A | 8/2000 | Mason, Jr. et al. |
| 5,621,629 A | 4/1997 | Hemminger et al. | | 6,112,192 A | 8/2000 | Capek |
| 5,627,759 A | 5/1997 | Bearden et al. | | 6,124,806 A | 9/2000 | Cunningham et al. |
| 5,631,636 A | 5/1997 | Bane | | 6,128,276 A | 10/2000 | Agee |
| 5,636,216 A | 6/1997 | Fox et al. | | 6,137,423 A | 10/2000 | Glorioso et al. |
| 5,640,679 A | 6/1997 | Lundqvist et al. | | 6,150,955 A | 11/2000 | Tracy et al. |
| 5,659,300 A | 8/1997 | Dresselhuys et al. | | 6,154,487 A | 11/2000 | Murai et al. |
| 5,668,803 A | 9/1997 | Tymes et al. | | 6,160,933 A | 12/2000 | Laude |
| 5,668,828 A | 9/1997 | Sanderford, Jr. et al. | | 6,160,993 A | 12/2000 | Wilson |
| 5,673,252 A | 9/1997 | Johnson et al. | | 6,172,616 B1 | 1/2001 | Johnson et al. |
| 5,684,472 A | 11/1997 | Bane | | 6,195,018 B1 | 2/2001 | Ragle et al. |
| 5,684,799 A | 11/1997 | Bigham et al. | | 6,199,068 B1 | 3/2001 | Carpenter |
| 5,691,715 A | 11/1997 | Ouellette | | 6,208,266 B1 | 3/2001 | Lyons et al. |
| 5,692,180 A | 11/1997 | Lee | | 6,218,953 B1 | 4/2001 | Petite |
| 5,696,501 A | 12/1997 | Ouellette et al. | | 6,233,327 B1 | 5/2001 | Petite |
| 5,696,765 A | 12/1997 | Safadi | | 6,246,677 B1 | 6/2001 | Nap et al. |
| 5,696,903 A | 12/1997 | Mahany | | 6,249,516 B1 | 6/2001 | Brownrigg et al. |
| 5,699,276 A | 12/1997 | Roos | | 6,333,975 B1 | 12/2001 | Brunn et al. |
| 5,714,931 A | 2/1998 | Petite et al. | | 6,363,057 B1 | 3/2002 | Ardalan et al. |
| 5,715,390 A | 2/1998 | Hoffman et al. | | 6,366,217 B1 | 4/2002 | Cunningham et al. |
| 5,717,604 A | 2/1998 | Wiggins | | 6,373,399 B1 | 4/2002 | Johnson et al. |
| 5,719,564 A | 2/1998 | Sears | | 6,393,341 B1 | 5/2002 | Lawrence et al. |
| 5,745,901 A | 4/1998 | Entner et al. | | 6,396,839 B1 | 5/2002 | Ardalan et al. |
| 5,748,104 A | 5/1998 | Argyroudis et al. | | 6,421,731 B1 | 7/2002 | Ciotti, Jr. et al. |
| 5,748,619 A | 5/1998 | Meier | | 6,430,268 B1 | 8/2002 | Petite |
| 5,751,914 A | 5/1998 | Coley et al. | | 6,437,692 B1 | 8/2002 | Petite et al. |
| 5,751,961 A | 5/1998 | Smyk | | 6,446,192 B1 | 9/2002 | Narasimhan et al. |
| 5,754,772 A | 5/1998 | Leaf | | 6,528,957 B1 * | 3/2003 | Luchaco ...................... 315/307 |
| 5,754,830 A | 5/1998 | Butts et al. | | 6,538,577 B1 | 3/2003 | Ehrke et al. |
| 5,757,783 A | 5/1998 | Eng et al. | | 6,643,278 B1 | 11/2003 | Panasik et al. |
| 5,768,148 A | 6/1998 | Murphy et al. | | 6,657,549 B1 | 12/2003 | Avery |
| 5,778,368 A | 7/1998 | Hogan et al. | | 6,684,245 B1 | 1/2004 | Shuey et al. |
| 5,787,437 A | 7/1998 | Potterveld et al. | | 6,751,563 B1 | 6/2004 | Spanier et al. |
| 5,790,789 A | 8/1998 | Suarez | | 6,867,707 B1 | 3/2005 | Kelley et al. |
| 5,790,809 A | 8/1998 | Holmes | | 6,996,215 B2 | 2/2006 | MacConnell |
| 5,801,643 A | 9/1998 | Williams et al. | | 7,012,546 B1 | 3/2006 | Zigdon et al. |
| 5,805,712 A | 9/1998 | Davis | | 7,145,265 B2 | 12/2006 | McNulty et al. |
| 5,808,558 A | 9/1998 | Meek et al. | | 7,209,840 B2 | 4/2007 | Petite et al. |
| 5,809,059 A | 9/1998 | Souissi et al. | | 7,262,709 B2 * | 8/2007 | Borleske et al. ......... 340/870.02 |
| 5,822,521 A | 10/1998 | Gartner et al. | | 7,286,812 B2 | 10/2007 | Manis et al. |

| | | | |
|---|---|---|---|
| 7,304,587 B2 | 12/2007 | Boaz | |
| 7,317,404 B2 | 1/2008 | Cumeralto et al. | |
| 7,412,235 B2 | 8/2008 | Larson et al. | |
| 7,412,338 B2 | 8/2008 | Wynans et al. | |
| 7,693,610 B2 * | 4/2010 | Ying | 700/295 |
| 8,014,905 B2 * | 9/2011 | Ehlers | 700/295 |
| 2001/0002210 A1 | 5/2001 | Petite | |
| 2001/0024163 A1 | 9/2001 | Petite | |
| 2002/0012323 A1 | 1/2002 | Petite et al. | |
| 2002/0013679 A1 | 1/2002 | Petite | |
| 2002/0019712 A1 | 2/2002 | Petite et al. | |
| 2002/0019725 A1 | 2/2002 | Petite | |
| 2002/0026957 A1 | 3/2002 | Reyman | |
| 2002/0027504 A1 | 3/2002 | Davis et al. | |
| 2002/0031101 A1 | 3/2002 | Petite et al. | |
| 2002/0094799 A1 | 7/2002 | Elliott et al. | |
| 2002/0125998 A1 | 9/2002 | Petite et al. | |
| 2002/0145537 A1 | 10/2002 | Mueller et al. | |
| 2002/0159426 A1 | 10/2002 | Kanemoto et al. | |
| 2002/0169643 A1 | 11/2002 | Petite et al. | |
| 2003/0036810 A1 | 2/2003 | Petite | |
| 2003/0036822 A1 | 2/2003 | Davis et al. | |
| 2003/0123442 A1 | 7/2003 | Drucker et al. | |
| 2003/0202512 A1 | 10/2003 | Kennedy | |
| 2004/0001008 A1 | 1/2004 | Shuey et al. | |
| 2004/0113810 A1 | 6/2004 | Mason, Jr. et al. | |
| 2005/0121526 A1 | 6/2005 | Stewart et al. | |
| 2005/0184881 A1 | 8/2005 | Dusenberry et al. | |
| 2005/0270173 A1 | 12/2005 | Boaz | |
| 2006/0052906 A1 | 3/2006 | Kates | |
| 2006/0111796 A1 | 5/2006 | Van Heteren | |
| 2006/0158177 A1 | 7/2006 | Ramirez | |
| 2007/0043477 A1 | 2/2007 | Ehlers et al. | |
| 2007/0096769 A1 | 5/2007 | Shuey | |
| 2008/0193584 A1 | 8/2008 | Cooke | |
| 2008/0272934 A1 * | 11/2008 | Wang et al. | 340/870.11 |

FOREIGN PATENT DOCUMENTS

| | | |
|---|---|---|
| EP | 0 446 979 A1 | 9/1991 |
| EP | 0 629 098 A2 | 12/1994 |
| EP | 1 071 185 | 1/2001 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 | 3/1990 |
| JP | 4290593 A | 10/1992 |
| JP | 05-260569 | 10/1993 |
| JP | 8194023 A | 7/1996 |
| WO | WO 93/02515 A1 | 2/1993 |
| WO | WO 93/04451 A1 | 3/1993 |
| WO | WO 95/32595 A1 | 11/1995 |
| WO | WO 96/10856 A1 | 4/1996 |
| WO | WO 2004/004364 | 1/2004 |

OTHER PUBLICATIONS

Internet Printout, http://www.ardis.com/RADIO, "Radio Coverage," Sep. 29, 1998, "Glossary of Terms," Sep. 29, 1998, "Radio Propagation in Free Space," Sep. 29, 1998, "Real World Propagation Variations," Sep. 29, 1998, "Probability of Reception vs. Calculation," Sep. 29, 1998.

Internet Printout, http://www.ram.com, BellSouth Wireless Data—Paging, Mobitex, Network, Business, Sep. 23, 1998:—MOBITEX®: The Heart of Every BellSouth Solution,—MOBITEX Features and Services: RAM Mobile Data White Paper, Feb. 1997,—Narrowband PCS Technologies: What are the Options?: RAM Mobile Data White Paper, Nov. 1997,—The Inherent Security of Data Over Mobitex Wireless Packet Data Networks, A RAM Mobile Data White Paper, Oct. 1995,—Comparative Analysis of Coverage and Performance: RAM & Ardis, 1998.

"MV-90 Read Only System" UTS Software Solutions for Utility Customers. (No Date). (No Page Numbers or Pages).

"Packet Radio: Applications for Libraries in Developing Countries", *UDT Series on Data Communication Technologies and Standards for Libraries*, 1993, Ch 1-6, 87 pages.

Brochure: TRF6900 Single-Chip RF Transceiver, Texas Instrument, 2001 ©.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Chlamtac, I. et al., "Optimizing the System of Virtual Paths", *IEEE ACM Transactions on Networking*, 1994, 2(6), 581-586.

Corcoran, P.M. et al., "Browser-Style Interfaces to a Home Automation Network", *IEEE Trans. on Consumer Electronics*, Nov. 1, 1997, 43(4), 1063-1069, XP-000768559.

Corcoran, P.M. et al., "CEBus Network Access via the World-Wide-Web", *International Conference on Consumer Electronics*, Jun. 5-7, 1996, 236-237, XP-002218722.

Desbonnet, Joe et al., "System Architecture and Implementation of CEBus/Internet Gateway", *IEEE*, 1997, 1057-1062.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://ww.ardis.com/RADIO, "An Overview of Radio Coverage," Sep. 29, 1998, "Radio Propagation," Sep. 29, 1998, "Factors Affecting ARDIS Coverage," Sep. 29, 1998, "The ARDIS Network Compared to Other Systems," Sep. 29, 1998.

Jubin, J., "Current Packet Radio Networks Protocols", *IEEE Infocom Proceedings*, 1985, 86-92.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Leung, V.C.M., "Internetworking Wireless Terminals to Local Area Networks Via Radio Bridges", *ICWC*, 1992, 126-129.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "Routing, Repeating, Power Control and Directional Techniques", *Packet Radio Networks*, Architectures, Protocols, Technologies and Applications, 1987, Ch 5, 105-129, 259-274.

Lynch, C.A. et al., "The Telecommunications Landscape", 1986, 7 pages.

MacGregor, W. et al., "Multiple Control Stations in Packet Radio Networks", *IEEE Military Communications Conference*, 1982, 10.3-1-10.3-5.

Markwalter, Brian et al., "CEBus Network Layer Description", *IEEE*, 1989, 571-575.

Newtown, Harry, *Newton's Telecom Dictionary*, 10th Edition, 1996, 243.

Newtown, Harry, *Newton's Telecom Dictionary*, Flatiron Publishing, Inc., 10th Ed., 1996, LAN (1 of 1): Cebus Overview (1-3): Cebus Industry Council (1 of 1).

Norenkov, et al., *Telecommunication Technologies and Networks, Moscow Bauman Technical Schoo*, 1988, (Signed for publication on Dec. 10, 1997), pp. 116-118, 80-87 [1] English Language Abstract Provided.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

Rappaport, T. S., "Wireless Communications, Principles and Practice," Prentice Hall PTR, 1996, pp. 410-413.

Shacham, N. et al., "Future Directions in Packet Radio Technology", *IEEE Infocom Proceedings*, 1985, 93-98.

Shachan, N. et al., "A Packet Radio Network for Library Automation", *IEEE Military Communications Conference*, 1987, 2, 21.3.1-21.3.7.

Wescott, J. et al., "A Distributed Routing Design for a Broadcast Environment", *IEEE Military Communications Conference*, 1982, 10.4-1-10.4-5.

Westcott, J.A., "Issues in Distributed Routing for Mobile Packet Radio Networks", *IEEE*, 1982, 233-238.

In the United States Patent and Trademark Office: Non-Final Office Action in U.S. Appl. No. 11/355,690, filed Feb. 16, 2006, 10 pages.

In the United States Patent and Trademark Office: Reply Transmittal Letter in Reply Responsive to Office Action dated Nov. 6, 2007 in U.S. Appl. No. 11/355,690, filed Feb. 16, 2006, Dated Apr. 7, 2008, 4 pages.

In the United States Patent and Trademark Office: Response to Office Action in U.S. Appl. No. 11/355,548, filed Feb. 16, 2006, dated Mar. 14, 2008, 13 pages.

U.S. Appl. No. 11/355,548: Non-Final Office Action, dated Sep. 14, 2007, 43 pages.

* cited by examiner ating at 10 am and ending at 4 pm may be designated as tier
TECHNIQUES FOR LIMITING DEMAND FROM AN ELECTRICITY METER WITH AN INSTALLED RELAY

CROSS-REFERENCE TO RELATED APPLICATIONS

This application claims the benefit of U.S. Provisional Application No. 61/061286, titled "Techniques for Limiting Demand from an Electricity Meter with an Installed Relay", filed on Jun. 13, 2008, the content of which is hereby incorporated by reference in its entirety. This application is also related to U.S. Pat. No. 7,427,927, titled "In-Home Display that Communicates with a Fixed Network Meter Reading System", issued Sep. 23, 2008, and U.S. Pat. No. 7,545,285, titled "Load Control Unit In Communication with a Fixed Network Meter Reading System", issued Jun. 9, 2009, the content of both patents are hereby incorporated by reference in their entireties.

BACKGROUND

Typically, providers of energy or commodities such as electricity, natural gas, and water, etc., have the utmost interest in measuring consumer consumption of the energy or commodity. Measured consumer consumption is useful for ensuring accurate billing for consumed energy and also for planning for future energy production needs. These providers, in many situations electrical energy utilities, may wish to measure total accumulated consumer consumption for the respective delivered energy or commodity. Utilities may also want to know how much energy, or a magnitude of energy, are being consumed at certain specific times or what peak (or maximum) magnitude of energy was consumed during certain time periods, such as an hour, day, week, or month, for example. This kind of energy magnitude measurement is commonly referred to as a demand measurement. In an electricity context, for example, a consumer's cumulative electrical energy consumption is typically measured by electronic electricity measurement meters (or electricity meters or simply "meters") in units of kilowatt hours (kWh) and the consumer's demand is typically measured in kilowatts (kW).

Electronic electricity meters are typically capable of measuring a demand of a consumer's electricity load, such as a residence, commercial equipment, or industrial equipment. Electricity meters may also be capable of providing an indication that a configurable demand threshold has been exceeded. This configurable demand threshold is typically a threshold for a "total" demand. A total demand is that demand value that represents a maximum, or peak, demand measured in a predetermined period of time, such as a day, week, or month, for example. Typically, the predetermined period of time for a total demand is a month, and as such, the total demand would be the highest measured demand in the month. Once the predetermined period of time ends, the total demand may be reset so that a new total demand for a next period of time may be determined. The configurable demand threshold represents a total demand value that is considered to be, usually by the utility, a maximum demand that the consumer's electricity load may consume without affecting the stability of the utility's electrical distribution system. For example, a consumer may be restricted by a tariff to a total demand of 25 kW.

It is common for utilities to assign designations to periods of time which fall somewhere within total demand periods, such as hours of a day, days of a week, or weeks of a month, etc., during which electricity is drawn from the utilities' electrical distribution system. These designated periods of time identify so-called time-of-use periods or time-of-use tiers (TOU tiers). By way of example only, a period of time starting at midnight and ending at 5 am on a particular day of the week, Monday for example, may be designated as tier D. Also by way of example only, the period starting at 5 am Monday and ending at 8 am Monday may be designated as tier A. To continue the example for Monday, the period starting at 8 am and ending at 10 am may be designated as tier B, the period starting at 10 am and ending at 4 pm may be designated as tier A, the period starting at 4 pm and ending at 8 pm may be designated as tier B, and the period starting at 8 pm and ending at midnight Tuesday morning may be designated as tier C.

There could be additional time-of-use tier designations identifying additional and/or different time-of-use tier periods. Also, such time-of-use tiers may have different designation labels. Utilities may assign certain billing rates to respective time-of-use tiers (or TOU tiers, or simply "tiers") to account for varying levels of burden to the utilities' electrical distribution systems as overall consumer demand for electricity tends to vary over the various TOU tiers. For example, consumers may pay more in tier B for the same amount of electrical energy consumed as that consumed in tier C. In addition, utilities may wish to know what the peak demand was for a particular TOU tier. The peak demand for a particular tier, or a time-of-use demand (or TOU demand), is something different from the total demand. As mentioned previously, the total demand represents a peak demand for a predetermined period of time such as a day, week, or month, whereas a time-of-use demand represents a peak demand for a designated period of time that falls within the period of time corresponding to the total demand. Accordingly, electricity meters may determine a time-of-use demand for the respective time-of-use tiers included within the total demand period of time.

Meters may also operate a load control that is integral to the meter, such as a switch or relay, in response to the consumer's electrical load exceeding a demand threshold (or register). The meter may set the relay or switch to cause some or all of the consumer's electrical load to become electrically de-energized. By doing so, the meter has effectively limited the demand consumed by the consumer's electricity load. The meter may electrically de-energize the electricity load directly through the integral load control. Or, the meter may electrically de-energize the electricity load with the integral load control indirectly via intermediate equipment, such as relays or switches external to the meter, for example.

SUMMARY

While limiting a demand for a consumer's electricity load based on criteria regarding a measured demand crossing a demand threshold (or register) is useful, it may be desirable to tailor a meter's demand limitation capability more closely to the measured total demand, time-of-use demand, or to the time-of-use tier itself. In addition to the demand limitation capability being more tailored to the time-of-use tiers, it may also be desirable for a meter to assist in the verification of procedural steps required in reestablishing electrical service to a consumer's electricity load that was electrically de-energized for exceeding demand thresholds or other various reasons.

A method embodiment may be performed by an electricity meter for limiting an electricity load that is in communication with the electricity meter. The electricity meter may have at least one load control and the electricity meter may have one or more predetermined time-of-use tiers. Each of the one or more predetermined time-of-use tiers may have a corresponding time-of-use demand threshold. The method may comprise determining a present time-of-use tier and determining a present time-of-use demand for the electricity load in the present time-of-use tier. Further, the method may include comparing the present time-of-use demand to the time-of-use demand threshold corresponding to the present time-of-use tier. In addition, the method may include setting the at least one load control to a de-energize mode when a de-energize condition is satisfied. The de-energize condition may include sub-conditions such as the present time-of-use demand exceeding the time-of-use demand threshold corresponding to the present time-of-use tier.

Another method embodiment may be performed by an electricity meter for limiting an electricity load in communication with the electricity meter. The electricity meter may have at least one load control and the electricity meter may have one or more predetermined time-of-use tiers. At least one of the one or more predetermined time-of-use tiers may have a corresponding limitation mode. The corresponding limitation mode may be adjustable between a limit setting and a no-limit setting. The method may comprise determining a present time-of-use and determining the limitation mode of the present time-of-use tier. The method may also include setting the at least one load control to a de-energize mode when a de-energize condition is satisfied. The de-energize condition may include the sub-conditions such as the limitation mode of the present time-of-use tier being set to the limit setting.

Another method embodiment may be performed by an electricity meter for limiting an electricity load in communication with the electricity meter. The electricity meter may have at least one load control. The method may comprise determining a present time-of-day and setting the at least one load control to a de-energize mode when a de-energize condition is satisfied. The de-energize condition may include the present time-of-day being within a predetermined range of time-of-day.

Another method embodiment may be performed by an electricity meter for detecting an electricity load in communication with the electricity meter. The electricity meter may have at least one load control and the at least one load control may be changeable between a de-energize mode and a re-energize mode. The method may comprise receiving a command to set the at least one load control from the de-energize mode to the re-energize mode. The method may also include setting the at least one load control from the de-energize mode to the re-energize mode and measuring an electrical current of the electricity load. Further, the method may include comparing the measured electrical current of the electricity load to a predetermined threshold. In addition, the method may include setting the at least one load control from the re-energize mode to the de-energize mode when the measured electrical current of the electricity load exceeds the predetermined threshold at any time before the end of a predetermined time interval.

In an embodiment, an electricity meter may be capable of limiting an electricity load in communication with the electricity meter. The electricity meter may comprise at least one load control and a meter controller. The meter controller may include one or more predetermined time-of-use tiers. Each of the one or more predetermined time-of-use tiers may have a corresponding time-of-use demand threshold. The meter controller may execute one or more actions including determining a present time-of-use tier and determining a present time-of-use demand for the electricity load in the present time-of-use tier. The actions may also include comparing the present time-of-use demand to the time-of-use demand threshold corresponding to the present time-of-use tier. Further, the actions may include setting the at least one load control to a de-energize mode when a de-energize condition is satisfied. The de-energize condition may include sub-conditions such as the present time-of-use demand exceeding the time-of-use demand threshold corresponding to the present time-of-use tier.

In an embodiment, an electricity meter may be capable of limiting an electricity load in communication with the electricity meter. The electricity meter may comprise at least one load control and a meter controller. The meter controller may include one or more predetermined time-of-use tiers. At least one of the one or more predetermined time-of-use tiers may have a corresponding limitation mode. The corresponding limitation mode may be adjustable between a limit setting and a no-limit setting. The meter controller may execute one or more actions including determining a present time-of-use tier and determining the limitation mode of the present time-of-use tier. The actions may also include setting the at least one load control to a de-energize mode when a de-energize condition is satisfied. The de-energize condition may include sub-conditions such as the limitation mode of the present time-of-use tier being set to the limit setting.

In an embodiment, an electricity meter may be capable of limiting an electricity load in communication with the electricity meter. The electricity meter may comprise at least one load control and a meter controller. The meter controller may execute one or more actions including determining a present time-of-day and setting the at least one load control to a de-energize mode when a de-energize condition is satisfied. The de-energize condition may include sub-conditions such as the present time-of-day being within a predetermined range of time-of-day.

In an embodiment, an electricity meter may be capable of detecting an electricity load in communication with the electricity meter. The electricity meter may comprise at least one load control. The at least one load control may be changeable between a de-energize mode and a re-energize mode. The electricity meter may also include a meter controller. The meter controller may execute one or more actions including receiving a command to set the at least one load control from the de-energize mode to the re-energize mode. The actions may also include setting the at least one load control from the de-energize mode to the re-energize mode and measuring an electrical current of the electricity load. The actions may further include comparing the measured electrical current of the electricity load to a predetermined threshold. In addition, the actions may include setting the at least one load control from the re-energize mode to the de-energize mode when the measured electrical current of the electricity load exceeds the predetermined threshold at any time before the end of a predetermined time interval.

In an embodiment, a method may be performed by an electricity meter that comprises verifying compliance on the part of a consumer of an electrical load with at least one step of a procedure In an embodiment, an electrical meter may comprise a meter controller. The meter controller may execute one or more actions including verifying compliance on the part of a consumer of an electrical load with at least one step of a procedure.

In an embodiment, a method may be performed by an electricity meter for limiting an electricity load. The method may comprise electrically de-energizing at least a part of the electricity load based on a measured time-of use demand of the electricity load in a time-of-use tier exceeding a predetermined threshold corresponding exclusively with the time-of-use tier.

In an embodiment, a method may be performed by an electricity meter for limiting an electricity load. The method may comprise electrically de-energizing at least a part of the electricity load based exclusively on a time-of-use tier.

In an embodiment, a method may be performed by an electricity meter for limiting an electricity load. The method may comprise electrically de-energizing at least a part of the electricity load based exclusively on a time-of-day.

DETAILED DESCRIPTION

Exemplary systems and methods for gathering meter data are described below with reference to FIGS. 1-2. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, may be operable to wirelessly communicate with each other and/or to communicate with one another via a wired network. A collector may be operable to automatically identify and register meters for communication with the collector. When a meter is installed, the meter becomes registered with the collector that can provide a communication path to the meter. The collectors may receive and compile metering data from a plurality of meter devices via wireless communications. Also, a communications server communicates with the collectors to retrieve the compiled meter data.

Figure 1:
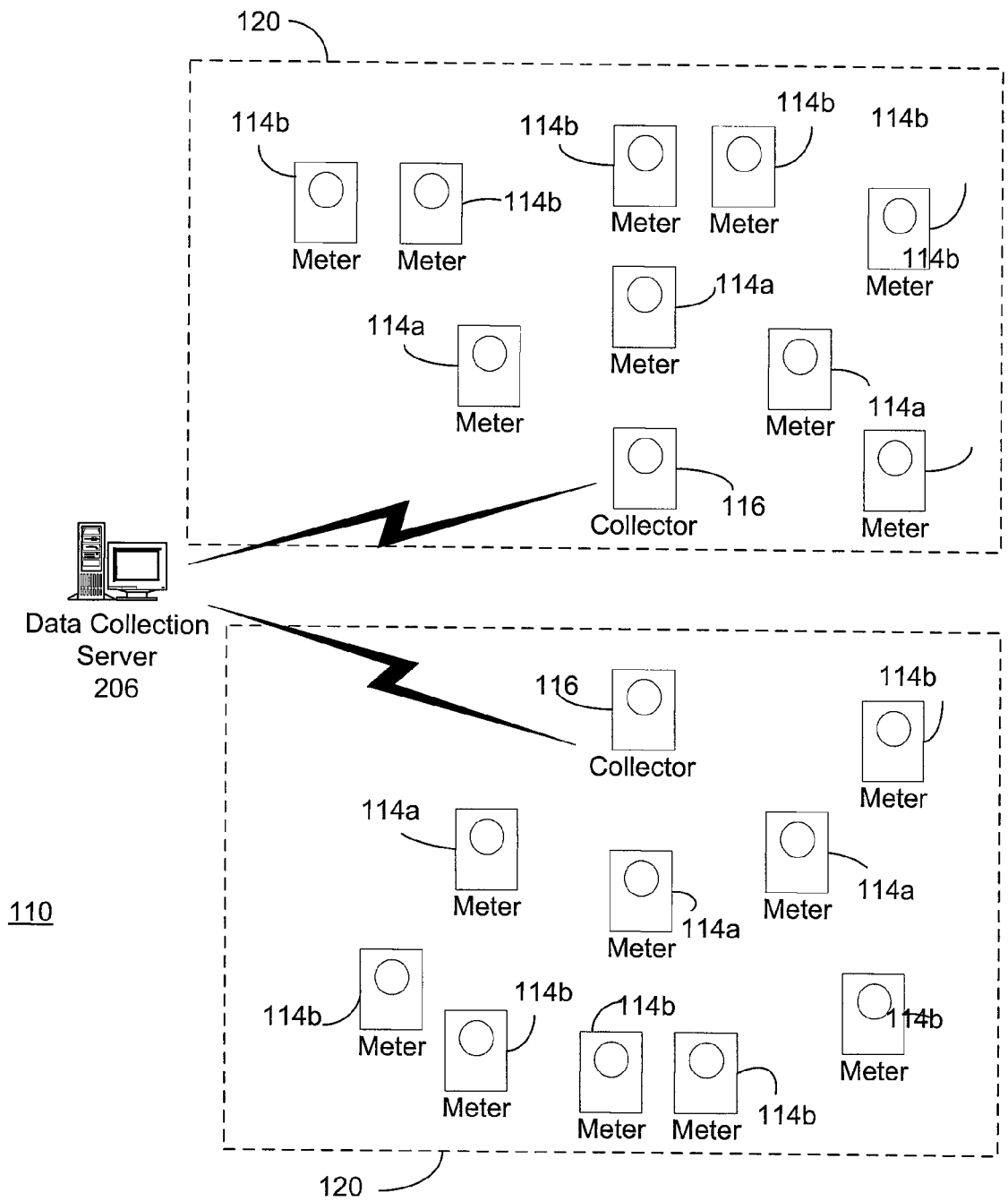
FIG. 1 is a diagram of an example of a data collection system including electricity meters consistent with the embodiments.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 may comprise an antenna and may be operable to transmit data, including service usage data, wirelessly or via wired connections. Meters 114 may be further operable to receive data wirelessly as well. In an illustrative embodiment, meters 114 may be, for example, electrical meters manufactured by Elster Electricity, LLC.

System 110 may further comprise collectors 116. Collectors 116 also may be meters operable to detect and record usage of a service or commodity such as, for example, electricity, water, or gas. Collectors 116 may comprise an antenna and may be operable to send and receive data wirelessly. In particular, collectors 116 may be operable to send data to and receive data from meters 114. In an illustrative embodiment, meters 114 and/or collectors 116 may be, for example, an electrical meter manufactured by Elster Electricity, LLC.

A collector 116 and the meters 114 for which it is configured to receive meter data define a subnet/LAN 120 of system 110. In the context of networking, meters 114 and collectors 116 may be considered as nodes in the subnet, or electricity control network 120. For each subnet/LAN 120, data may be collected at collector 116 and periodically transmitted to a data collection server 206. The data collection server 206 may store the data for analysis and preparation of bills, for example, among other uses. The data collection server 206 may be a specially programmed general purpose computing system and may communicate with collectors 116 wirelessly or via a wireline connection such as, for example, a dial-up telephone connection or fixed wire network.

Generally, collector 116 and meters 114 may communicate with and among one another using any one of several robust wireless techniques such as, for example, frequency hopping spread spectrum (FHSS) and direct sequence spread spectrum (DSSS) at 900 MHz. As illustrated, meters 114a may be referred to as "first level" meters that communicate with collector 116, and meters 114b may be referred to as "higher level" meters that communicate with other meters in the network and that forward information to the collector 116.

Figure 2:
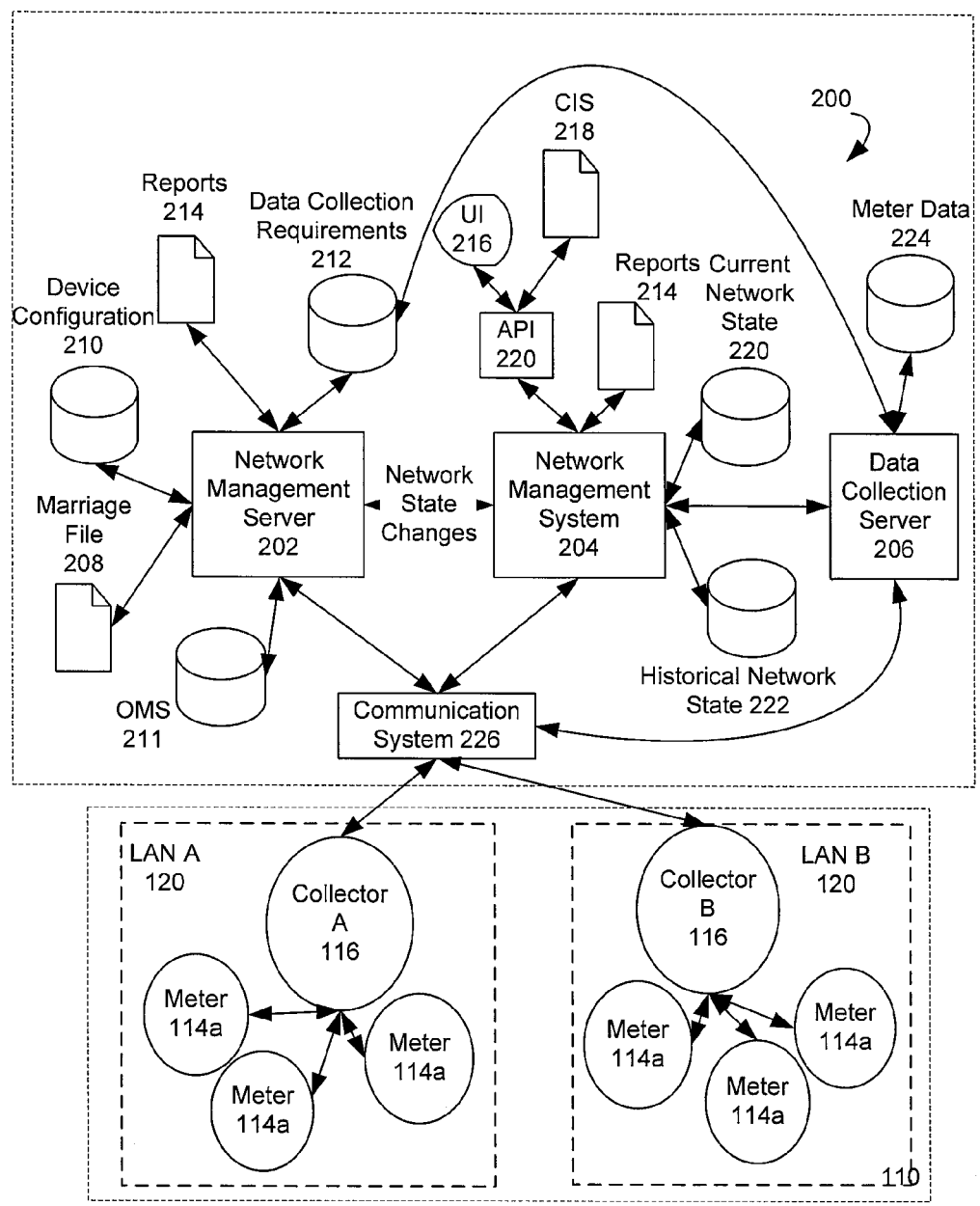
FIG. 2 is a diagram of a portion of the data collection system of FIG. 1 and an example of a data management system.

Referring now to FIG. 2, there is illustrated a system 200. The system 200 may include a network management server 202, a network management system (NMS) 204 and a data collection server 206 that together manage one or more subnets/LANs 120 and their constituent nodes. The NMS 204 may track changes in the network state, such as new nodes registering/unregistering with the system 200, node communication paths changing, etc. This information may be collected for each subnet/LAN 120 and may be detected and forwarded to the network management server 202 and data collection server 206.

Communication between nodes and the system 200 may be accomplished using a LAN identification, however customers also may query and communicate with nodes using their own identifier. To this end, a marriage file 208 may be used to correlate a customer serial number, a manufacturer serial number and LAN identification for each node (e.g., meters 114a and collectors 116) in the subnet/LAN 120. A device configuration database 210 may store configuration information regarding the nodes. For example, in the metering system 110, the device configuration database may include data regarding time of use (TOU) switch points, etc. for the meters 114a and collectors 116 communicating to the system 200. A data collection requirements database 212 may contain information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

A network management system (NMS) 204 maintains a database describing the current state of the global fixed network system (current network state 220) and a database describing the historical state of the system (historical network state 222). The current network state 220 may contain data regarding current meter to collector assignments, etc. for each subnet/LAN 120. The historical network state 222 may be a database from which the state of the network at a particular point in the past can be reconstructed. The NMS 204 may be responsible for, among other things, providing reports 214 about the state of the network. The NMS 204 may be accessed via an API 220 that is exposed to a user interface 216 and a Customer Information System (CIS) 218. Other external interfaces may be implemented as well. In addition, the data collection requirements stored in the database 212 may be set via the user interface 216 or CIS 218.

The data collection server 206 collects data from the nodes (e.g., collectors 116) and stores the data in a database 224. The data may include metering information, such as energy consumption and may be used for billing purposes, etc. by a utility provider.

The network management server 202, network management system 204 and data collection server 206 may communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, TCP/IP network, etc., or any combination of the above and enables the system 200 to communicate with the metering system 110.

Figure 3:
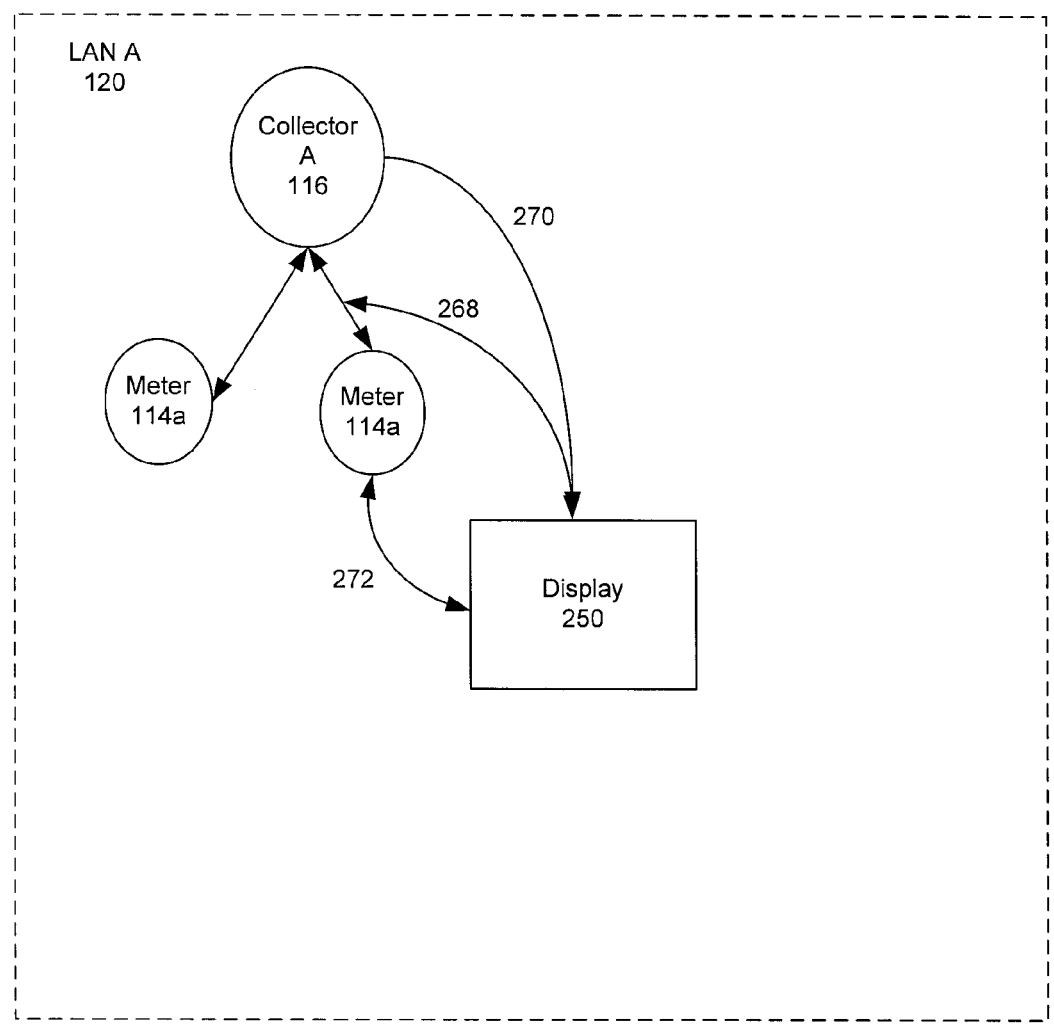
FIG. 3 is a diagram of a portion of the data collection system of FIG. 1 and an exemplary interface device consistent with the embodiments.

Referring now to FIG. 3, an in-home display 250 includes a radio system and antenna to enable it to communicate with meters 114 (114a and/or 114b) and collectors 116 using the existing radio infrastructure. As described above, the meters 114 and collectors 116 communicate via, e.g., Frequency Hopping Spread Spectrum radio. By communicating with the existing radio and meter firmware, the in-home display 250 can provide information to a user without significantly impacting the operation and cost of the meter 114/collector 116. A complete description of the in-home display 250 is found in U.S. Pat. No. 7,427,927, entitled "In-Home Display that Communicates with a Fixed Network Meter Reading System," the content of which is incorporated herein by reference in its entirety. The in-home display 250 may be provided as a separate stand-alone unit or could be integrated into another customer device such as a thermostat.

The in-home display 250 gains timely updates that may be correlated to the meter read interval by listening to the normal meter read traffic. When the associated meter 114 transmits its meter data, the display 250 recognizes the meter's unique ID and updates the display memory with the current meter read information (communication link 268). The display 250 may maintain a duplicate copy of the meter's configuration. Also, a broadcast message may be sent throughout the system 110 that is directed to the in-home displays 250 (communication link 270). After receipt of the broadcast, in-home display will randomly or via a schedule extract required information from it associated meter 114 (communication link 272). The individual displays 250 would be able to randomly select communication time windows in order to minimize contention traffic between displays or the collector could assign slot times. Using above noted solutions, the in-home display update would occur at approximately the same rate as the utility update rate.

A manual override capability may be offered to the residential or commercial owner for the instances where more up-to-date metering data is desired. The display device 250 may optionally include a "read button" that when activated, extracts the most recent meter data. The "read button" functionality may also provide a menu system to allow the customer to extract more specific meter data than a standard update would provide using link 272.

In yet another embodiment, the in-home display 250 may be placed as a node in the system 110. Here the meter read interval may not be correlated and the in-home display 250 contains the communications bound for the system 200. In this case, the collector 116 would update and read from the meter 114 and would additionally download information to the in-home display 250. This may be accomplished using link 272, where the link is a LAN communications link, such as those used between the collector 116 and the meters 114. Downloaded information could include the last meter read data, "time synch," "tier pricing" or "TOU schedule" information. Additionally, information such as energy pricing could be downloaded to the in-home display 250 to provide an accurate representation of tier or total consumption.

Figure 4:
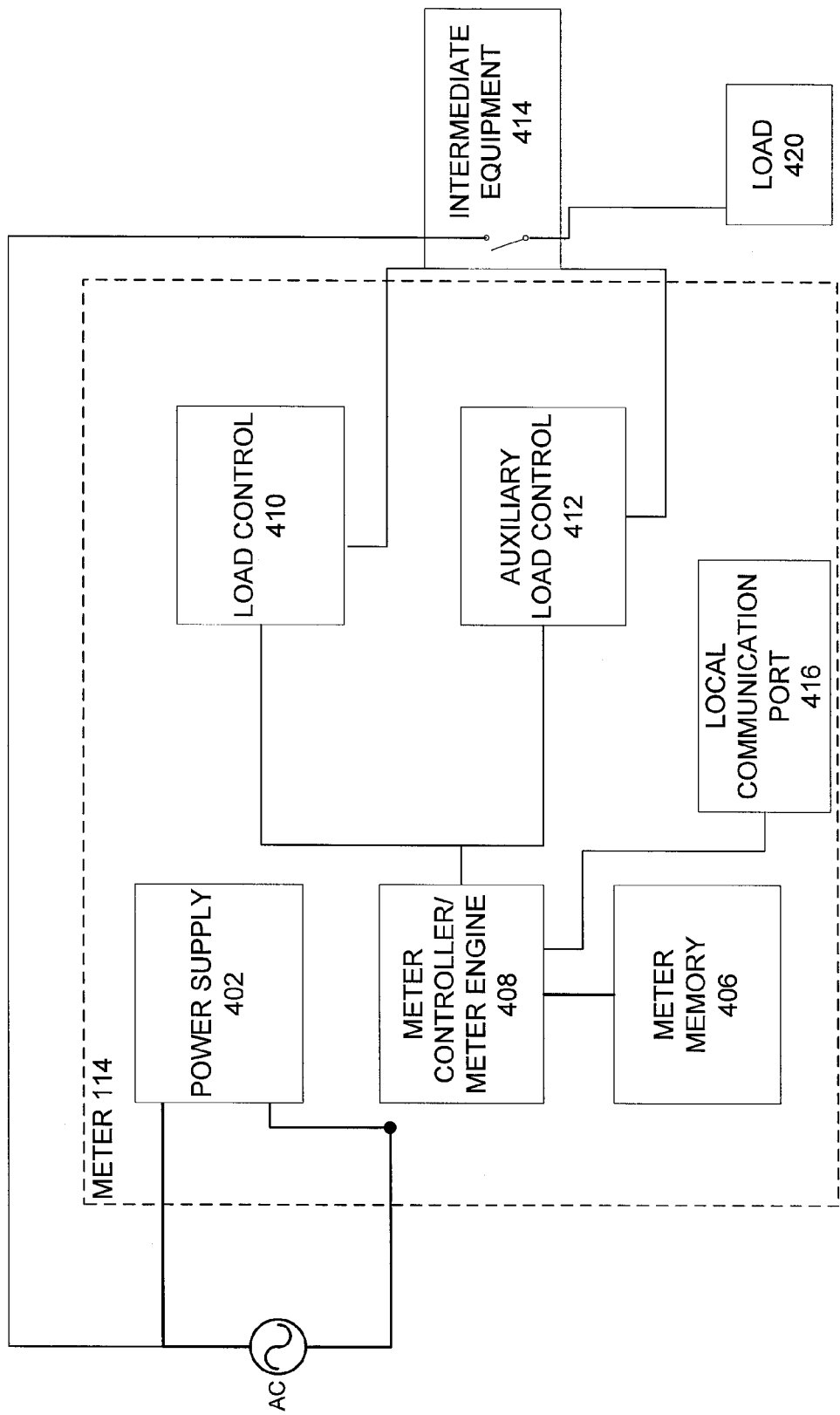
FIG. 4 illustrates a block diagram of an exemplary electricity meter consistent with the embodiments.

Referring now to FIG. 4, in an embodiment, the electricity meter 114 may include a power supply 402, meter memory 406, a meter controller 408, a load control 410, and an auxiliary load control 412. The load control 410 and/or the auxiliary load control 412 may be referred to as service disconnect switches. Although only two controls are shown, the meter 114 may have more than one load control 410 and/or more than one auxiliary load control 412. The meter 114 may be in communication with a consumer's electricity load 420 in such a way that the meter 114 may measure and/or calculate electrical characteristics of the load 420 such as, but not limited to, demand, current, voltage, power factor, electrical energy consumption, frequency, etc. The meter power supply 402 provides all electrical energy necessary to the meter 114 and all of its components to execute the respective functions of the meter 114. The meter memory 406 may be an EEPROM or any other form of non-volatile memory. The meter memory 406 is capable of storing meter controller 408 configuration instructions along with all values calculated by the meter controller 408. The meter memory 406 may also include registers to hold the various predetermined calculated or measured parameter thresholds used by the meter controller 408 in the various control functions that will be described in further detail below.

The meter controller 408 may also be referred to as the meter engine 408. The meter controller 408 is a configurable processing device that may be configured to perform or execute all meter actions or functions such as, but not limited to, measurements, calculations, required of the meter 114. In the description of the embodiments, reference may be made to a function of the meter 114 or the meter controller 408. For purposes of this description, the meter 114 and the meter controller 408 may be used interchangeably when describing the functions performed by the meter 114.

The load control 410 and the auxiliary load control 412 may be switches or relays that, either directly or indirectly via intermediate equipment 414 operate to electrically de-energize, or conversely re-energize, some or all of the consumer's load 420. In an embodiment, the load control 410 and/or the auxiliary load control 412 may operate directly to de-energize or re-energize the consumer's electrical load 420 without the use of the intermediate equipment 414. The intermediate equipment 414 may include switches and/or relays, or the like. The meter controller 408 may set a mode of the load control 410 or auxiliary load control 412 to cause the desired change in the electrically energized or electrically de-energized state of the consumer's electricity load 420. The local communication port 416 may permit configuration changes to the meter controller's 408 functions or may be used to set override conditions for such functions. The local communication port 416 may be an optical type interface or it may be an electrical signal based computer communications interface, such as one that enables communication via RS-232 or RS-422, or the like.

The meter 114 may calculate the total demand for the predetermined total demand period and the TOU demand for the current TOU tier over one or more configurable demand interval or intervals that occur within the total demand period. By way of example only, the demand interval may be 15 minutes, 30 minutes or 60 minutes. Other demand interval durations are possible. A calculated demand for a given demand interval represents an average demand over the span of the demand interval (i.e., 15 minutes for a selected 15 minute demand interval). For example, if the demand of an electricity load 420 over a particular 15 minute demand interval varies over that time, the average value of the demand will be calculated in consideration of the whole demand interval. If the calculated demand at the end of the interval is greater than the current value of the total demand for the present total demand period, the total demand value is updated to reflect the total demand from the recently completed demand interval.

Demand calculations may also be made over the designated demand interval in real time or continuously. In other words, a demand calculation may be made at any point within the demand interval. A real time demand calculation made before the end of the demand interval may be made in consideration of how far into the demand interval the calculation is made and also how much time remains in the demand interval after the calculation is made. For example, if a demand calculation is made 5 minutes into a 15 minute demand calculation, then the calculated value is adjusted for the demand interval being only two-thirds completed. Thus, with a continuous demand calculation, the total demand value for the present total demand period may be updated at a point in time when a new peak total demand is calculated. Therefore, a new total demand may be calculated not only at the end of any demand interval, but also at any time during a demand interval.

The total demand may be reset at one or more the following times for various embodiments: an end of the predetermined demand period, usually based on clock boundaries; at a time when a real time is received from the network 120 and it changes the meter 114 from a relative time to the real time; at a time when the real time is received from the network 120 and it sets the meter's 114 time forward across the total demand period boundary; the meter's 114 time is set backwards; at time when a total demand reset operation is performed; or when a power failure occurs, the total demand being reset on power restoration.

The TOU demand may be calculated in the same demand interval or intervals as the total demand is calculated. The TOU demand may also calculated in real time or continuously as the total demand may be calculated. When a peak demand (or a new peak demand) is calculated in one of the demand intervals which occur in a TOU tier period, the TOU demand for that tier may be updated. A calculated demand may be considered a new TOU demand for the current tier, but that same calculated demand may not be considered a new total demand for the current total demand period. At the time of a TOU tier change, the TOU demand for the new tier may be calculated and updated as necessary. The TOU demand for the previous TOU tier may not be calculated or updated until that tier once again becomes the present or active tier.

For purposes of example only, and not limitation, a typical meter 114 calculation sequence for a series of tiers in a particular day may look like as follows:

At midnight, for billing purposes, a demand reset command sets all current total demand values, all current TOU demand values, and all consumption values to zero. For midnight-5 am: tier C (off peak), with a cost of $0.05 per kWh, there is a measured consumption of 10 kWh with a peak calculated demand of 5 kW. For 5 am-8 am: tier A (mid rate), with a cost of $0.08 per kWh, there is a measured consumption of 15 kWh with a peak calculated demand of 10 kW. For 8 am-10 am: tier B (on peak), with a cost of $0.25 per kWh, there is a measured consumption of 10 kWh with a peak calculated demand of 12 kW. For 10 am-4 pm: tier A (mid rate), again with a cost of $0.08 per kWh, there is a measured consumption of 30 kWh with a peak calculated demand of 15 kW. For 4 pm-8 pm: tier B (on peak), again with a cost of $0.25 per kWh, there is a measured consumption of 20 kWh with a peak calculated demand of 14 kW. For 8 pm-Midnight: tier C (off peak), again with a cost of $0.05 per kWh, there is a measured consumption of 25 kWh with a peak calculated demand of 8 kW. From this exemplary sequence, the respective TOU consumption of energy (kWh) and the respective TOU tier demand (kW) would be: for tier A: 45 kWh, 15 kW; for tier B: 30 kWh, 14 kW; and for tier C: 35 kWh, 8 kW. The total consumption for the sequence would be 110 kWh and the total demand at the end of the sequence would be 15 kW.

A TOU tier change may occur coincidently with an end of a demand interval, or the TOU tier change may occur at some point during a demand interval. If a TOU tier change occurs during a particular demand interval, the TOU demand calculation for that particular demand interval is adjusted to account for the split interval (from the TOU demand perspective) so that the calculated TOU demand is applied to the appropriate tier. In other words, the TOU demand calculated in the duration of the demand interval before the TOU tier change is applied as necessary to the previous tier and the TOU demand calculated in the remainder of the demand interval after the TOU tier change is applied as necessary to the current tier. In an embodiment, the TOU demand for any or each tier may be reset when the total demand is reset.

In an embodiment, the TOU demand for a non-present (or inactive) tier will not be reset at the time of a tier change to a new tier. Instead, the TOU demand for an inactive tier will be maintained at the value calculated during the most recent period for which that tier was the active tier. In other embodiments, the TOU demand may be reset for a tier at the time of a tier change to another tier. The meters' 114 memory 406 may be capable of storing over time all calculated meter 114 values, such as but not limited to total demand, TOU demand, and any and all corresponding demand thresholds. Therefore, all demand calculations made at any time, even if reset, may be accessed by the meter engine 408 or by the control network 120.

By way of example only, and not limitation, an exemplary TOU demand and total demand calculation across two tiers C and B assuming a constant load of 30 kW and a demand interval of 15 minutes follows:

A demand reset may occur at midnight to start a new billing cycle and the demand registers for total demand and TOU demand were all set to zero at midnight in conjunction with the demand reset, usually corresponding to a billing date and a new total demand period of time. A new demand interval may then start at midnight and will run through 12:15 am. The tier at midnight may be tier C. At 12:05, the tier may change from tier C to tier B and may remain in tier B for the rest of the demand interval. The TOU demand calculated at the end of the 15 minute interval would be 10 kW for tier C, which may or may not be a new peak TOU demand for tier C. The TOU demand calculated for the tier B would be 20 kW, which would be a peak TOU demand for tier B being that this was the first TOU demand calculation for tier B after the demand values were reset. The total demand calculated would be 30 kW which would be a peak total demand being that it is the first calculation of total demand made in the new demand period.

For purposes of illustration of the split demand interval scenario, at a time just before the tier change at 12:05 am, the tier C TOU demand calculated would be 10 kW, the total demand calculated would be 10 kW, and the tier B TOU demand calculated would be 0 kW. Again for illustration, at 12:10 am, tier C TOU demand calculation would be 10 kW, the total demand calculation would be 20 kW, and the tier B TOU demand would be 10 kW. And finally at 12:15 am (the end of the first demand interval of the new demand period), the tier C TOU demand calculation would be 10 kW, the total demand calculation would be 30 kW, and the tier B TOU demand calculation would be 20 kW.

In order to determine situations in which consumer electricity load 420 consumption exceeds a predetermined demand threshold, be it a total demand threshold or a TOU demand threshold, each time the demand calculations are updated, the meter controller 408 may compare the new demand value (TOU or total) against a corresponding configurable demand threshold. For example, the meter 114 may compare a total demand value against a predetermined threshold for total demand. Also for example, the meter 114 may compare a TOU demand for the respective TOU tiers against respectively corresponding predetermined thresholds for the respective TOU tiers. These corresponding predetermined TOU demand thresholds for the respective TOU tiers may be exclusively related to the respectively corresponding TOU tier demand calculations. The corresponding predetermined TOU demand threshold for a particular TOU tier may be adjusted independently of any other predetermined TOU demand threshold for other TOU tiers and also independently of the predetermined total demand threshold.

The comparison of the calculated respective TOU demands and the total demand to the respectively corresponding predetermined thresholds may be made at a time when the respective TOU demands and/or the total demand calculations are made and/or at a time when the TOU demand values and/or the total demand value are updated. This update may occur when the calculations do result in a new TOU demand and/or a new total demand (i.e., a new peak is calculated). The comparisons may also be made at a time when one or more of the respective predetermined TOU demand thresholds and/or the predetermined total demand threshold are changed. The respective predetermined TOU demand and total demand thresholds may be changed or adjusted remotely by a command from the control network 120 or locally at the meter 114 via a communication port 416.

In another embodiment, the respective TOU demand values and the total demand value may be compared to a single predetermined demand threshold. Thus, the comparison between the total demand value or if any of the respective TOU demand values may be made with a single common configurable predetermined demand threshold. The common predetermined demand threshold may be changed or adjusted remotely by a command from the control network 120 or locally at the meter 114 via a communication port 416.

If the TOU demand and/or total demand has exceeded either their respective corresponding predetermined demand thresholds or the common predetermined demand threshold, a status warning flag may be set and/or the meter 114 may be configured to open the load control 410 in order to cause some (a part or a portion) or all of the consumer's electricity load 420 to be electrically de-energized. By de-energizing at least some, if not all, of the consumer's electricity load 420 the demand will effectively be lowered. The load control 410 may have at least two modes, a de-energize mode and a re-energize mode. The de-energize mode may cause the load control 410 to open, or to otherwise assume the state required to cause the consumer's electricity load 420 to become fully or partially de-energized. The re-energize mode may cause the load control 410 to close, or to otherwise assume a state required to cause the consumer's electricity load 420 to become fully or partially re-energized.

Figure 5:
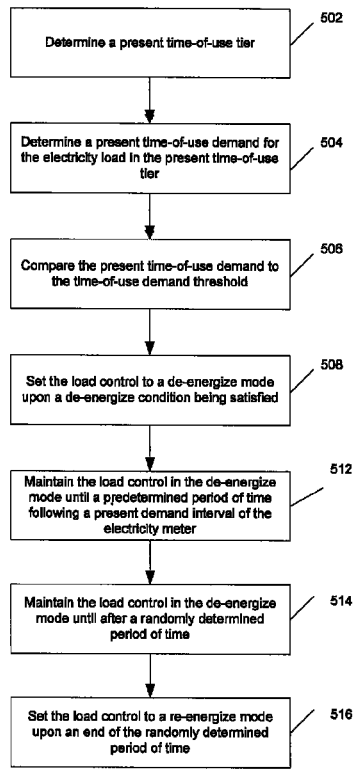
FIG. 5 is a flowchart illustration of methods performed by an electricity meter consistent with the embodiments.

By way of example, and not limitation, an exemplary method embodiment that may be performed by the electricity meter 114 for limiting an electricity load 420 that is in communication with the electricity meter 114 is illustrated in FIG. 5. In the embodiment, the electricity meter 114 may have at least one load control 410 and the electricity meter 114 may have one or more predetermined time-of-use tiers. Each of the one or more predetermined time-of-use tiers may have a corresponding time-of-use demand threshold. In step 502, the meter 114 may determine a present time-of-use tier, and at step 504, the meter 114 may determine a present time-of-use demand for the electricity load 420 in the present time-of-use tier. In step 506, the meter may compare the present time-of-use demand to the time-of-use demand threshold corresponding to the present time-of-use tier. In step 508, the meter 114 may set the at least one load control 410 to a de-energize mode when a de-energize condition is satisfied. The de-energize condition may include sub-conditions such as the present time-of-use demand exceeding the time-of-use demand threshold corresponding to the present time-of-use tier.

In an embodiment, the meter controller 408 may be configured so that one or more of the TOU demand tiers may have a corresponding configurable demand limitation mode. The configurable demand limitation mode may have at least two settings, one setting being a limit demand and another setting being a no-limit demand. The state of the demand limitation mode for the corresponding TOU tier may determine whether the meter controller 408 takes any demand limiting action during the corresponding TOU tier.

By way of example, and not limitation, if the demand limitation mode for a tier A is set to no-limit demand (or no-limit), then even should a TOU demand value for tier A exceed the corresponding predetermined TOU demand threshold for tier A, no action may be taken with the load control 410 to de-energize, either partially or fully, the consumer's electricity load 420. In other words, if the setting for the demand limitation mode for tier A is no-limit demand, then even with a measured TOU demand being greater than the TOU demand threshold for tier A, the load control 410 may not be placed into the de-energize mode. Again by example only, should the setting for the demand limitation mode for tier B be set to limit demand, then should the measured TOU demand for tier B exceed the TOU demand threshold for tier B, the load control 410 may be placed into the de-energize mode in order to cause at least some of the consumer's electricity load 420 to become electrically de-energized.

In an embodiment, the demand limitation mode may also determine whether the meter controller 408 will take any action with the load control 410 to cause the consumer's electricity load 420 to become de-energized in the event that the measured total demand exceeds the total demand threshold. By way of example only, should the measured total demand exceed the predetermined threshold for the total demand during tier C, and the demand limitation mode for tier C is set to no-limit demand, then no action will be taken by the load control 410 to cause the consumer's load 420 to become de-energized.

Thus, for example only and not limitation, depending on the particular embodiment and the setting of the demand limitation modes for the respective TOU tiers, when the total demand threshold and/or the respective TOU demand thresholds are exceeded, the meter 114 may set the load control 410 to the de-energize mode for all of the respective TOU tiers. Or, the meter 114 may set the load control 410 to the de-energize mode only if the demand limitation mode for the respective tier has been set to limit demand. If none of the demand limitation modes for the respective TOU tiers are set to the limit demand mode, then the load control 410 may not be set to the de-energize mode in response to a demand threshold crossing during any tier. The setting of the demand limitation mode may be commanded remotely by the control network 120 or via a local communication port 416 of the meter 114.

Figure 10:
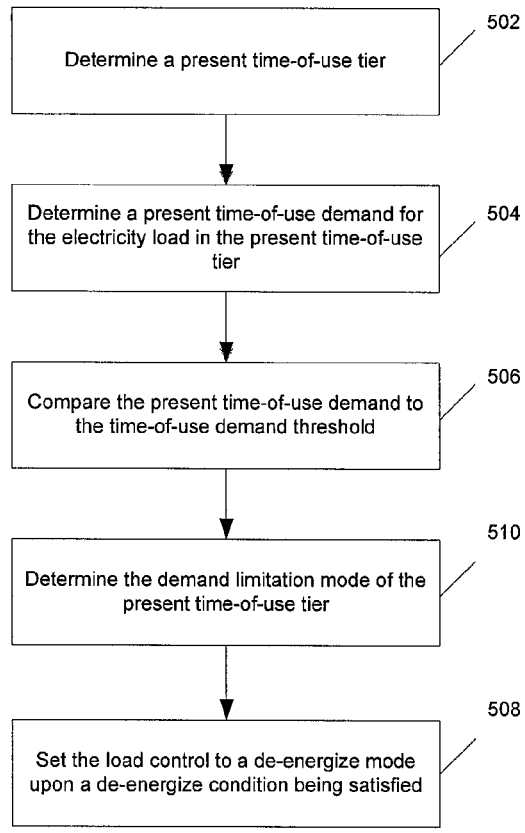
FIG. 10 is a flowchart illustration of methods performed by an electricity meter consistent with the embodiments.

Referring to FIG. 10, in an exemplary embodiment in which at least one of the one or more predetermined time-of-use tiers may have a corresponding demand limitation mode and the corresponding demand limitation mode may be changeable between a limit setting and a no-limit setting, as described before, in step 502, the meter 114 may determine a present time-of-use tier, and at step 504, the meter 114 may determine a present time-of-use demand for the electricity load 420 in the present time-of-use tier. In step 506, the meter may compare the present time-of-use demand to the time-of-use demand threshold corresponding to the present time-of-use tier. At step 510 the meter 114 may determine the demand limitation mode of the present time-of-use tier. In step 508, the meter 114 may set the at least one load control 410 to a de-energize mode when a de-energize condition is satisfied. The de-energize condition may include sub-conditions such as the present time-of-use demand exceeding the time-of-use demand threshold corresponding to the present time-of-use tier. Also, the de-energize condition may further include the sub-condition of the demand limitation mode of the present time-of-use tier being set to the limit setting.

In an embodiment, the load control 410, when set to the de-energize mode, may remain in the de-energize mode for the remainder of the demand interval in which the total demand and/or the TOU demand exceeded their respective thresholds. In another embodiment, the load control 410 may remain in the de-energize mode for a configurable period of time (0-255 minutes, for example only, and not limitation) after the end of the demand interval in which the total demand and/or the TOU demand exceeded their respective thresholds. This configurable period of time beyond the end of the interval in which the total demand and/or the TOU demand exceeded their respective thresholds may be referred to as the "demand limit penalty." The potential burden of a demand limit penalty may provide a motivation for the consumer not to exceed the predetermined demand thresholds.

Referring once again to FIG. 5, in step 512 of an exemplary embodiment, the meter 114 may maintain the at least one load control 410 in the de-energize mode from a time that the at least one load control 410 is set to the de-energize mode until a predetermined period of time that may follow a present demand interval of the electricity meter 114.

In another embodiment, after the demand limit penalty time period has expired, the meter controller 408 may delay for a random amount of time before setting the load control 410 into the re-energize mode, thereby further increasing the time the consumer's electricity load 420 will be de-energized. The randomization period of time may prevent multiple metering devices 114 that may have each experienced a demand threshold crossing and a subsequent demand limiting action during the same demand interval from re-energizing their respective electrical loads at exactly the same time. Thus, this randomized re-energize delay may aid in maintaining stability in an electrical energy provider's distribution system.

Again with reference to FIG. 5, at step 514 of an exemplary embodiment the meter 114 may maintain the at least one load control 410 in the de-energize mode from a time that the at least one load control is set to the de-energize mode until after a randomly determined period of time following a predetermined period of time that follows a present demand interval of the electricity meter. At step 516, the meter 114 may set the at least one load control 410 to a re-energize mode at an end of the randomly determined period of time.

Each time that the load control 410 is placed into the de-energize mode in response to a predetermined demand threshold crossing may be considered a "demand limiting operation." Meters 114 may be capable of counting how may demand limiting operations that the meter controller 408 initiates via the load control 410. In an embodiment, if the meter controller 408 counts more than a configurable predetermined number of demand limiting operations, 1-255 for example and not limitation, in a configurable predetermined period of time, the meter controller 408 may maintain the load control 410 in the de-energize mode until such time that the meter 114 receives a service disconnect close command, or a lockout override command. The action for which the meter controller 408 maintains the load control 410 in the de-energize mode may be referred to as a "demand limiting lockout." The default configurable predetermined period of time over which the number of demand limiting operations are counted may be one day, for example. For example only, if six demand limiting operations are counted in one day's time, that may be sufficient to invoke the demand limiting lockout feature.

In an embodiment, the meter 114 may receive the service disconnect close command or the lockout override command remotely from the control network 120 or via the local communications port 416 on the meter 114. Both the number of demand limiting operations and the period of time over which the operations are counted may be adjusted by the control network 120 or via the local communications port 416. The meter 114 may align the predetermined period of time over which the number of demand limiting operations are counted to clock boundaries. In an embodiment, if the predetermined period of time over which the number of demand limiting operations are counted is greater than 24 hours, then that period of time may be an integer multiple of days and the lockout counts may restart at midnight of the appropriate day. In another embodiment, if the predetermined period of time over which the number of demand limiting operations are counted is less than 24 hours, the meter 114 may start the first period at midnight, and there may be an integer number of such periods per day.

Figure 6:
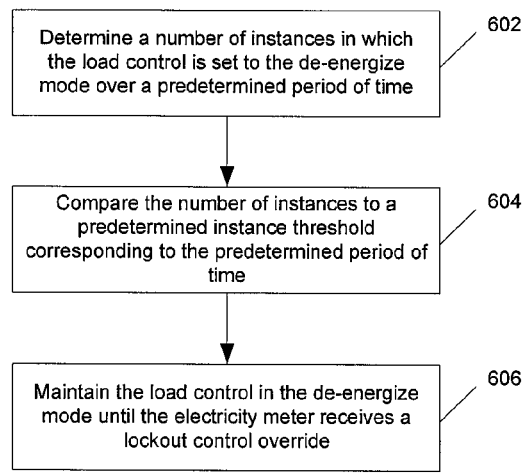
FIG. 6 is a flowchart illustration of methods performed by an electricity meter consistent with the embodiments.

Referring to FIG. 6, in an exemplary embodiment, at step 602 the meter 114 may determine a number of instances in which the at least one load control 410 is set to the de-energize mode over a predetermined period of time. At step 604, the meter 114 may compare the number of instances to a predetermined instance threshold that corresponds to the predetermined period of time. At step 606, the meter 114 may maintain the at least one load control 410 in the de-energize mode when the number of instances exceeds the predetermined instance threshold, and continue maintaining the load control 410 in the de-energize mode until the electricity meter 114 receives a lockout control override.

In an embodiment, the meter 114 may support a feature that may be used to verify that a consumer of electricity has complied with procedural steps regarding the restoration of at least some electrical service to the consumer's electrical load 420. Electrical utilities may wish to ensure that consumers such as home owners as well as commercial and industrial consumers are complying with procedural steps that, among other things, require that the consumer at least temporarily disconnect their electrical load 420 from a provider of electricity or electrical energy before electrical service is restored to the consumer. Such procedures enhance safety, as well as providing other benefits. Consumer procedural compliance may be accomplished in the home owner context by the home owner opening the main breaker in the residence's electrical distribution system. Electrical utilities may also wish to receive an acknowledgment from the consumer that the consumer has fulfilled their procedural requirements, without dispatching service personnel to communicate with the home owner.

In an embodiment, the meter 114 may receive a command to adjust or change the load control 410 from the de-energize mode to the re-energize mode. The command to adjust the load control 410 may be received remotely from the control network 120 or via the local communication port 416. The meter 114 may measure the electrical current that is being drawn by the consumer's electricity load 420, with which the meter 114 is in communication. The meter controller 408 may compare the measured electrical current of the consumer's electricity load 420 to one or more configurable predetermined thresholds. The meter controller 408 may set the mode of the load control 410 from re-energize to de-energize if the measured electrical current of the consumer's electricity load 420 exceeds one or more of the predetermined thresholds at any time before the end of at least one configurable predetermined time interval. In an embodiment, the one or more predetermined thresholds may respectively correspond to a predetermined time interval.

By way of example and not limitation, when an electrical utility desires to restore electricity to a consumer, the utility will send a command via the control network 120 to the meter 114 to adjust the load control 410 from the de-energize mode to the re-energize mode. The meter 114 may adjust the mode of the load control 410 to re-energize and may measure the electrical current drawn by the electricity load 420. The meter 114 may also compare the measured electrical current to a configurable predetermined threshold. The meter 114 may adjust the mode of the load control 410 from re-energize to de-energize if the measured electrical current exceeds the configurable predetermined threshold at any time before the end of a predetermined interval of time (or within the predetermined interval of time).

By way of further example, should the meter 114 measure an electrical current of the consumer's electricity load of greater than 3.0 amperes (amps) at any time within 30 milliseconds, then the meter 114 may set the load control 410 from the re-energize mode to the de-energize mode. In the previous example, the energy provider may consider an electrical current of greater than 3.0 amps in less than 30 milliseconds to indicate that the consumer has not, in fact, opened the main breaker at their residence. Larger thresholds may correspond to shorter time intervals. Optimally, there should be practically zero measurable electrical current if the consumer has complied with the procedural steps. Various electrical current thresholds and predetermined time intervals are contemplated.

Figure 9:
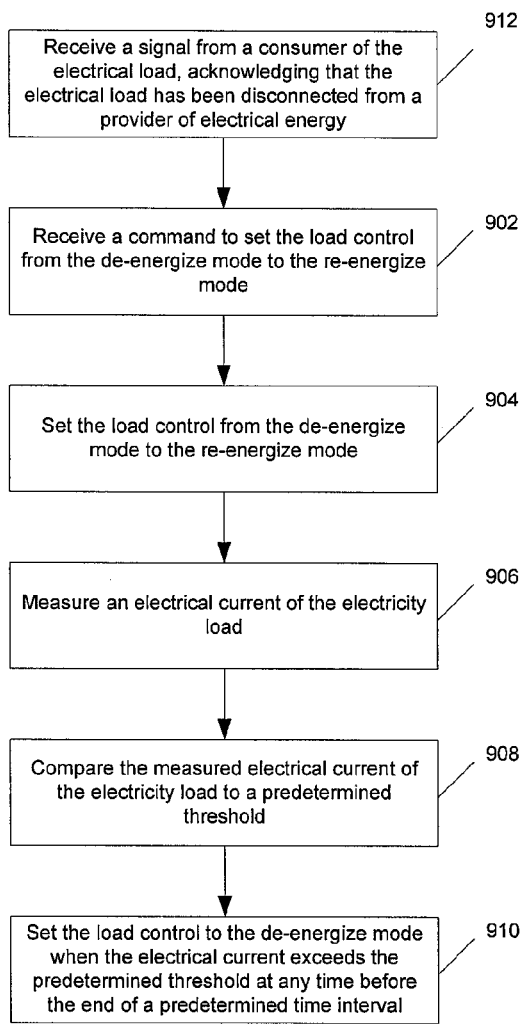
FIG. 9 is a flowchart illustration of methods performed by an electricity meter consistent with the embodiments.

Referring to FIG. 9, in an exemplary embodiment, at step 902, the meter 114 may receive a command to set the at least one load control 410 from the de-energize mode to the re-energize mode. At step 904, the meter 114 may set the at least one load control 410 from the de-energize mode to the re-energize mode. At step 906, the meter 114 may measure an electrical current of the electricity load 420. At step 908, the meter 114 may compare the measured electrical current of the electricity load 420 to a predetermined threshold. Further, at step 910, the meter 114 may set the at least one load control 410 from the re-energize mode to the de-energize mode if the measured electrical current of the electricity load 420 exceeds the predetermined threshold at any time before the end of a predetermined time interval.

In an embodiment, the meter 114 may receive a signal that represents an acknowledgement from the consumer that the consumer has complied with the procedural requirement to at least temporarily disconnect their electrical load 420 from the provider of electrical energy. For example, the consumer may use a function configurable on the in-home display 250 to send a signal representing acknowledging procedural compliance to the system 110. In other embodiments, the consumer may use an interactive telephone based system or an Internet based system hosted by the electrical energy provider or a third party to send the acknowledgement signal to the system 110. The meter 114 may receive a corresponding signal of consumer compliance from the system 110 via the electricity control network 120.

Referring once again to FIG. 9, at step 912 in an exemplary embodiment, the meter may receive a signal from a consumer of the electrical load 420. The signal may represent an acknowledgement of the consumer that the electrical load 420 has been at least temporarily disconnected from a provider of electrical energy.

In an embodiment, in the event the consumer failed to comply with the procedure, the consumer may need to wait until a specific time or may be told when the load control 410 has been set once again to the re-energize mode, thus ensuring that the meter's 114 delay time has expired before electrical service to the consumer's load 420 is restored.

In an embodiment, the meter 114 may include at least one auxiliary load control 412. The auxiliary control 412 may be, but is not limited to, an integral switch or relay, like the load control 410. Again, like the load control 410, the auxiliary load control 412 may have at least two modes, a de-energize mode and a re-energize mode. The de-energize mode may cause the auxiliary load control 412 to open, or to otherwise assume the state required to cause the consumer's electricity load 420 to become fully or partially de-energized. The re-energize mode may cause the auxiliary load control 412 to close, or to otherwise assume the state required to cause the consumer's electricity load 420 to become fully or partially re-energized.

In an embodiment, the meter controller 408 may be configured to operate the auxiliary load control 412 on any time based schedule regardless of the TOU demand or total demand measured by the meter 114 in order to cause the reduction, either partially or fully, a consumer's electricity load 420. In another embodiment, the meter controller 408 may be configured to operate the auxiliary load control 412 to cause the reduction of the consumer's electrical load 420, either fully or partially, based on the respective tiers. By way of example only, the meter controller 408 may be configured to set the mode of the auxiliary load control 412 to de-energize to either partially or fully reduce the consumer's electricity load 420 upon tier D becoming the active or present tier.

In yet another embodiment, the meter controller 408 may be configured to operate the auxiliary load control 412 based on the setting of the demand limitation mode of the respective TOU tiers, which were discussed previously. For example, the meter controller may be configured to set the mode of the auxiliary load control 412 to de-energize upon tier D becoming the active tier and the demand limitation mode for tier D being set to limit demand.

Figure 7:
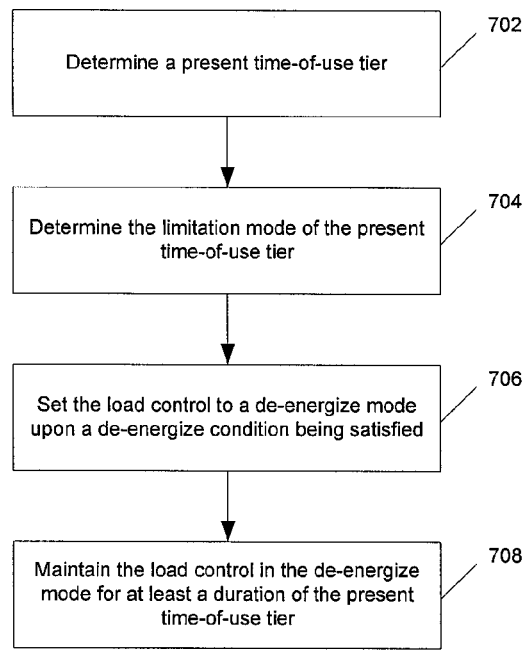
FIG. 7 is a flowchart illustration of methods performed by an electricity meter consistent with the embodiments.

Referring to FIG. 7, at step 702 in an exemplary embodiment, the meter 114 may determine a present time-of-use tier, and at step 704 the meter 114 may determine the limitation mode of the present time-of-use tier. At step 706, the meter 114 may set the at least one auxiliary load control 412 to a de-energize mode when a de-energize condition is satisfied. The de-energize condition may include sub-conditions such as the limitation mode of the present time-of-use tier being in the limit setting. Further, at step 708, the meter 114 may maintain the at least one auxiliary load control 412 in the de-energize mode for at least a duration of the present time-of-use tier.

In another embodiment, the scheduling resolution of TOU tiers may be exploited, but a completely independent set of switch points may be used to determine the mode of the auxiliary load control 412. The different set of switch points may represent a time-of-day or the switch points may represent demand limitation thresholds which represent different values than those of the predetermined thresholds corresponding to the respective measured TOU demands and/or the measured total demand. By way of example only, a meter controller 408 may be configured to set the mode of the auxiliary load control 412 to de-energize upon a condition being satisfied, such as the present time-of-day being within a predetermined range of time-of-day.

Figure 8:
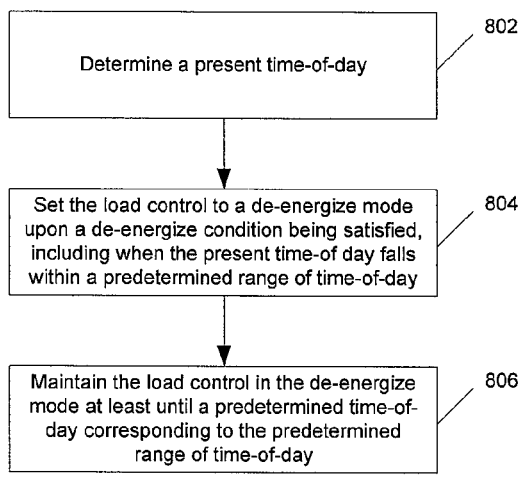
FIG. 8 is a flowchart illustration of methods performed by an electricity meter consistent with the embodiments.

Referring to FIG. 8, at step 802 of an exemplary embodiment, the meter 114 may determine a present time-of-day. At step 804, the meter 114 may set the at least one auxiliary load control 412 to the de-energize mode when a de-energize condition is satisfied. The de-energize condition may include sub-conditions such as the present time-of-day being within a predetermined range of time-of-day. At step 806, the meter 114 may maintain the at least one auxiliary load control 412 in the de-energize mode for at least a period of time beginning at the time-of-day the at least one auxiliary load control 412 was set to the de-energize mode and ending at a predetermined time-of-day corresponding to the predetermined range of time-of-day.

In another embodiment the meter controller 408 may be configured to operate the auxiliary load control 412 upon receiving a command to do so remotely from the control network 120 or via the local communication port 416. In yet another embodiment, the meter controller 408 may be configured to operate the auxiliary load control 412 upon a TOU demand or total demand value exceeding a corresponding predetermined threshold. Also, in an embodiment, the meter controller 408 may be configured to set the auxiliary load control 412 mode to de-energize for the duration of the demand penalty time period discussed previously, thereby electrically de-energizing some or all of the consumer's electricity load 420 for the penalty period.

In another embodiment, a consumer, for example a residential consumer or homeowner, may override the operation of the auxiliary load control 412 by signaling the electricity meter 114. The override signal may be accomplished, for example, by a button (not shown), a reed switch (not shown) in the meter 114 activated by a magnet, or by a command sent from the in-home user display 250.

On certain occasions, an electric utility may experience a critical peak condition. Peak conditions may represent times during which the utility is experiencing unusual situations, such as but not limited to larger than typical consumer demand for electrical energy. During these critical peak conditions, the utility may wish to change or adjust the various configurable parameters associated with the features discussed previously, such as but not limited to the TOU demand or total demand limitation, penalty periods, demand limiting lockouts, procedural compliance verification with re-energizing consumer loads, and the operation of the load control 410 and the auxiliary load control 412, among others. Embodiments contemplate that the meter controller 408 may include a tier override mode.

The meter controller's 408 tier override mode may be activated by a command remotely from the electricity control network 120 or via the local communication port 416 of the meter 114. While the meter's 114 tier override mode is active, the various configurable parameters such as, but not limited to, the respective TOU demand predetermined thresholds, the total demand predetermined threshold, the respective demand limiting modes for the TOU tiers, the predetermined period of time for the demand limit penalty, the predetermined number of demand limiting operations and/or the predetermined period of time used to determine whether a demand limit lockout should occur, the electrical current threshold and/or the predetermined time intervals used to determine is a consumer has complied with procedures for restoration of electrical service, the predetermined tiers, and/or switch points, and/or the predetermined range of the time-of-day and/or the predetermined time-of-day corresponding to the predetermined range of time-of-day which may be used to determine if the auxiliary load control 412 should be set to the de-energize mode may be changed to new parameters, or new values, or new settings (which ever applies to the respective parameter).

The meter 114 may use the new parameters, new values, or settings during the override period, where the override period may be defined by a start date and start time and a stop date and stop time when the meter controller 408 is placed into the override mode and then taken out of the override mode. When the override period has expired, the meter may revert to the previous parameters, values, settings that were in place before the override period commenced. While commonly thought of as a need to assign a higher tariff during an emergency condition, utilities could also lower a tariff during the override period. Therefore, in an embodiment, the new parameters, new values, or new settings implemented during an override period may be more favorable to the consumer of electricity than the parameters, values, and settings used outside of the override period. For example, the predetermined TOU demand thresholds may be raised to larger values thereby providing the consumer with the ability to draw larger demands during some or all of the TOU tiers without being penalized or having their demands limited.

Figure 11:
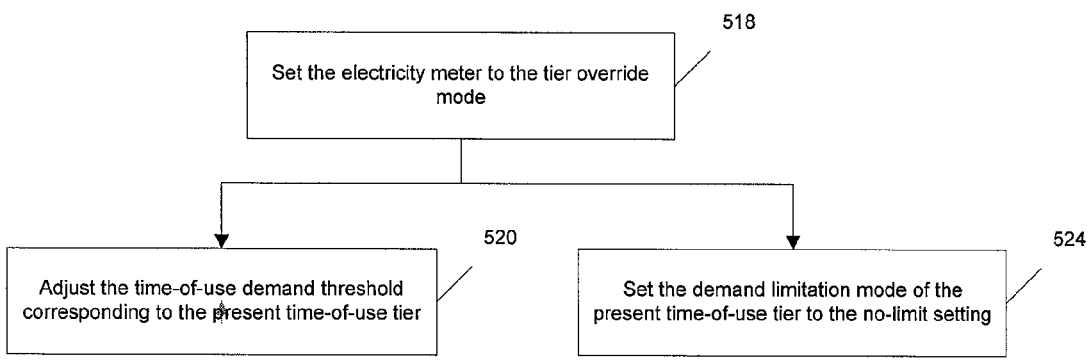
FIG. 11 is a flowchart illustration of methods performed by an electricity meter consistent with the embodiments.

Referring to FIG. 11, in a exemplary embodiment in which the meter 114 may have a tier override mode and may be in communication with the electricity control network 120 that may command the meter 114 into the tier override mode, at step 518 the meter 114 may be set to the tier override mode. At step 520, the meter 114 may adjust the time-of-use demand threshold corresponding to the present time-of-use tier. The adjusted time-of-use demand threshold may be maintained for a duration of time in which the electricity meter 114 is in the tier override mode.

Continuing to refer to FIG. 11, in an exemplary embodiment in which at least one of the one or more predetermined time-of-use tiers may have a corresponding demand limitation mode and the corresponding demand limitation mode may be changeable between a limit setting and a no-limit setting, at step 524, the meter 114 may set the demand limitation mode of the present time-of-use tier to the no-limit setting. The no-limit setting may be maintained for a duration of time in which the electricity meter 114 is in the tier override mode.

The foregoing examples have been provided merely for the purpose of explanation and are in no way to be construed as limiting of the contemplated embodiments. While various embodiments have been described, it is understood that the words which have been used herein are words of description and illustration, rather than words of limitation. Further, although described with reference to particular examples, the embodiments are not intended to be limited to the particular examples disclosed but rather are intended to cover all modifications that are within the spirit and scope of the embodiments.

What is claimed is:

1. A method performed by an electricity meter for limiting an electricity load in communication with the electricity meter, the electricity meter having at least one load control and the electricity meter having one or more predetermined time-of-use tiers, each of the one or more predetermined time-of-use tiers having a corresponding time-of-use demand threshold, the method comprising:
    determining a present time-of-use tier of the one or more predetermined time-of-use tiers;
    determining a present time-of-use demand for the electricity load in the present time-of-use tier;
    comparing the present time-of-use demand to the time-of-use demand threshold corresponding to the present time-of-use tier;
    setting the at least one load control to a de-energize mode upon a de-energize condition being satisfied, the de-energize condition including the present time-of-use demand exceeding the time-of-use demand threshold corresponding to the present time-of-use tier;
    determining a number of instances in which the at least one load control is set to the de- energize mode over a predetermined period of time;
    comparing the number of instances to a predetermined instance threshold corresponding to the predetermined period of time; and
    maintaining the at least one load control in the de-energize mode upon the number of instances exceeding the predetermined instance threshold, the maintaining continuing until the electricity meter receives a lockout control override.

2. The method of claim 1, in which at least one of the one or more predetermined time-of-use tiers has a corresponding demand limitation mode, the corresponding demand limitation mode being changeable between a limit setting and a no-limit setting, the method further comprising determining the demand limitation mode of the present time-of-use tier, and
    the de-energize condition further including the demand limitation mode of the present time-of-use tier being the limit setting.

3. The method of claim 1, in which the de-energize mode causes at least a part of the electricity load to become electrically de-energized.

4. The method of claim 1, in which the electricity meter has a tier override mode and the electricity meter is also in communication with an electricity control network, the electricity control network capable of commanding the electricity meter into the tier override mode, the method further comprising:
    setting the electricity meter to the tier override mode; and
    adjusting the time-of-use demand threshold corresponding to the present time-of-use tier, the adjusted time-of-use demand threshold being maintained for a duration of time in which the electricity meter is the tier override mode.

5. The method of claim 2, in which the electricity meter has a tier override mode and the electricity meter is also in communication with an electricity control network, the electricity control network capable of commanding the electricity meter into the tier override mode, the method further comprising:
    setting the electricity meter to the tier override mode; and
    setting the demand limitation mode of the present time-of-use tier to the no-limit setting, the no-limit setting being maintained for a duration of time in which the electricity meter is in the tier override mode.

6. The method of claim 1, in which the electricity meter receives the lockout control override either remotely from an electricity control network or via a local communication port of the electricity meter.

7. A method performed by an electricity meter for limiting an electricity load in communication with the electricity meter, the electricity meter having at least one load control and the electricity meter having one or more predetermined time-of-use tiers, at least one of the one or more predetermined time-of-use tiers having a corresponding demand limitation mode, the corresponding demand limitation mode being adjustable between a limit setting and a no-limit setting, the method comprising:
    determining a present time-of-use tier of the one or more predetermined time-of-use tiers;
    determining the demand limitation mode of the present time-of-use tier;
    setting the at least one load control to a de-energize mode upon a de-energize condition being satisfied, the de-energize condition including the demand limitation mode of the present time-of-use tier being the limit setting;
    determining a number of instances in which the at least one load control is set to the de- energize mode over a predetermined period of time;
    comparing the number of instances to a predetermined instance threshold corresponding to the predetermined period of time; and
    maintaining the at least one load control in the de-energize mode upon the number of instances exceeding the predetermined instance threshold, the maintaining continuing until the electricity meter receives a lockout control override.

8. The method of claim 7, further comprising:
    maintaining the at least one load control in the de-energize mode for at least a duration of the present time-of-use tier.

9. The method of claim 7, in which the de-energize mode causes at least a part of the electricity load to become electrically de-energized.

10. A method performed by an electricity meter for limiting an electricity load in communication with the electricity meter, the electricity meter having at least one load control, the method comprising:
    determining a present time-of-day;
    setting the at least one load control to a de-energize mode upon a de-energize condition being satisfied, the de-energize condition including the present time-of-day being within a predetermined range of time-of-day;

determining a number of instances in which the at least one load control is set to the de- energize mode over a predetermined period of time;

comparing the number of instances to a predetermined instance threshold corresponding to the predetermined period of time; and maintaining the at least one load control in the de-energize mode upon the number of instances exceeding the predetermined instance threshold, the maintaining continuing until the electricity meter receives a lockout control override.

11. The method of claim 10, further comprising:

maintaining the at least one load control in the de-energize mode for at least a period of time beginning at a time-of-day the at least one load control is set to the de-energize mode and ending at a predetermined time-of-day corresponding to the predetermined range of time-of-day.

12. The method of claim 10, in which the de-energize mode causes at least a part of the electricity load to become electrically de-energized.

13. A method performed by an electricity meter for detecting an electricity load in communication with the electricity meter, the electricity meter having at least one load control, the at least one load control being changeable between a de-energize mode and a re-energize mode, the method comprising:

receiving a command to set the at least one load control from the de-energize mode to the re-energize mode;

setting the at least one load control from the de-energize mode to the re-energize mode;

measuring an electrical current of the electricity load;

comparing the measured electrical current of the electricity load to a predetermined threshold;

setting the at least one load control from the re-energize mode to the de-energize mode upon the measured electrical current of the electricity load exceeding the predetermined threshold at any time before an end of a predetermined time interval;

determining a number of instances in which the at least one load control is set to the de- energize mode over a predetermined period of time;

comparing the number of instances to a predetermined instance threshold corresponding to the predetermined period of time; and maintaining the at least one load control in the de-energize mode upon the number of instances exceeding the predetermined instance threshold, the maintaining continuing until the electricity meter receives a lockout control override.

14. The method of claim 13, in which the de-energize mode causes at least a part of the electricity load to become electrically de-energized.

15. The method of claim 13, in which the command to set the at least one load control from the de-energize mode to the re-energize mode is received from an electricity control network or via a local communication port of the electricity meter.

16. The method of claim 13, further comprising receiving a signal from a consumer of the electrical load, the signal representing an acknowledgement of the consumer that the electrical load has been at least temporarily disconnected from a provider of electrical energy.

* * * * *